(12) United States Patent
Wang et al.

(10) Patent No.: US 11,499,007 B2
(45) Date of Patent: Nov. 15, 2022

(54) HIGHLY STRETCHABLE, TRANSPARENT, AND CONDUCTIVE POLYMER

(71) Applicant: The Board of Trustees of the Leland Stanford Junior University, Stanford, CA (US)

(72) Inventors: Yue Wang, Palo Alto, CA (US); Zhenan Bao, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 15/776,622

(22) PCT Filed: Jan. 13, 2017

(86) PCT No.: PCT/US2017/013538
§ 371 (c)(1),
(2) Date: May 16, 2018

(87) PCT Pub. No.: WO2017/124020
PCT Pub. Date: Jul. 20, 2017

(65) Prior Publication Data
US 2018/0327543 A1  Nov. 15, 2018

Related U.S. Application Data

(60) Provisional application No. 62/433,024, filed on Dec. 12, 2016, provisional application No. 62/279,561, filed on Jan. 15, 2016.

(51) Int. Cl.
*C08G 61/12* (2006.01)
*C08K 5/3445* (2006.01)
(Continued)

(52) U.S. Cl.
CPC ............ *C08G 61/126* (2013.01); *C08L 65/00* (2013.01); *C09D 165/00* (2013.01); *H01B 1/127* (2013.01);
(Continued)

(58) Field of Classification Search
CPC .......... H01B 1/12; H01B 1/122; H01B 1/124; H01B 1/127; H01B 1/128; C08G 61/126;
(Continued)

(56) References Cited

U.S. PATENT DOCUMENTS 5,367,041 A * 11/1994 Wudl ..................... C08G 61/00
                                                             252/500
7,438,832 B2 * 10/2008 Majumdar ........... C08K 5/0091
                                                             252/500
(Continued)

FOREIGN PATENT DOCUMENTS

WO  WO-2015088999 A1 *  6/2015  ............. C08L 65/00
WO  WO-2015089001 A  *  6/2015  ............. C08L 25/18

OTHER PUBLICATIONS

Xia et al. ("Highly conductive PEDOT:PSS films prepared through a treatment with zwitterions and their application in polymer photovoltaic cells," J. Mater. Chem., vol. 20, pp. 9740-9747). (Year: 2010).*

(Continued)

*Primary Examiner* — Matthew R Diaz
(74) *Attorney, Agent, or Firm* — Foley & Lardner LLP

(57) ABSTRACT

A polymer composition includes a conductive polymer and at least one stretchability and electrical conductivity (STEC) enhancer, wherein a content of the STEC enhancer in the composition is at least about 1 wt. % of the composition.

9 Claims, 35 Drawing Sheets

(51) Int. Cl.

| | | |
|---|---|---|
| C08K 5/42 | (2006.01) | |
| C08K 5/521 | (2006.01) | |
| C08K 5/53 | (2006.01) | |
| C08L 25/18 | (2006.01) | |
| H01B 1/12 | (2006.01) | |
| C09D 165/00 | (2006.01) | |
| C08L 65/00 | (2006.01) | |
| C08K 5/3432 | (2006.01) | |
| C08K 5/43 | (2006.01) | |

(52) U.S. Cl.
CPC ............. *C08G 2261/1424* (2013.01); *C08G 2261/3223* (2013.01); *C08G 2261/512* (2013.01); *C08G 2261/62* (2013.01); *C08G 2261/794* (2013.01); *C08K 5/3432* (2013.01); *C08K 5/3445* (2013.01); *C08K 5/42* (2013.01); *C08K 5/43* (2013.01); *C08K 5/521* (2013.01); *C08K 5/53* (2013.01); *C08K 2201/001* (2013.01); *C08L 25/18* (2013.01); *C08L 2203/20* (2013.01)

(58) Field of Classification Search
CPC .... C08G 2261/1424; C08G 2261/3223; C08G 2261/512; C08G 2261/62; C08G 2261/794; C08K 5/3432; C08K 5/3445; C08K 5/42; C08K 5/43; C08K 5/521; C08K 5/53; C08K 2201/001; C09D 233/54; C09D 233/56; C09D 233/58; C09D 233/60; C08L 25/18; C08L 65/00; C08L 2203/20
See application file for complete search history.

(56) References Cited

U.S. PATENT DOCUMENTS

| | | | | |
|---|---|---|---|---|
| 7,510,745 | B2* | 3/2009 | Tao | C09D 165/00 427/350 |
| 7,842,197 | B2* | 11/2010 | Kitamura | C08J 5/18 252/500 |
| 8,440,306 | B2* | 5/2013 | Asai | C08G 61/126 345/173 |
| 8,697,309 | B2* | 4/2014 | Ohno | H01M 8/1048 429/498 |
| 8,784,690 | B2* | 7/2014 | Badre | H01B 1/122 252/500 |
| 8,945,432 | B2* | 2/2015 | Towns | C08L 65/00 252/511 |
| 10,003,126 | B2* | 6/2018 | Sotzing | H01Q 1/368 |
| 10,005,914 | B2* | 6/2018 | Sotzing | B05D 1/005 |
| 2003/0219640 | A1 | 11/2003 | Nam et al. | |
| 2004/0243204 | A1 | 12/2004 | Maghribi et al. | |
| 2006/0263661 | A1* | 11/2006 | Takizawa | H01B 1/122 429/482 |
| 2008/0017852 | A1* | 1/2008 | Huh | H01L 51/0037 257/40 |
| 2008/0139710 | A1* | 6/2008 | Tsukada | C08J 3/09 524/100 |
| 2012/0224247 | A1* | 9/2012 | Sotzing | H01M 10/0565 359/265 |
| 2014/0048747 | A1* | 2/2014 | Balaganesan | H01L 31/0256 252/510 |
| 2015/0322276 | A1 | 11/2015 | Cao et al. | |
| 2016/0075875 | A1* | 3/2016 | Hatakeyama | C08L 25/18 252/500 |

OTHER PUBLICATIONS

U.S. Appl. No. 62/151,457, provisional application of Sotzing et al. (U.S. Pat. No. 10,003,126), filed Apr. 23, 2015. (Year: 2015).*
U.S. Appl. No. 62/151,456, provisional application of Sotzing et al. (U.S. Pat. No. 10,005,914), filed Apr. 23, 2015. (Year: 2015).*
Bubnova, O. et al. (2013) "Semi-metallic polymers," Nat. Mater. 13:190-194.
Dobbelin, M. et al. (2007) "Influence of Ionic Liquids on the Electrical Conductivity and Morphology of PEDOT:PSS Films," Chem. Mater. 19:2147-2149.
Dobbelin, M. et al. (2008) "A new approach to hydrophobic and water-resistant poly(3,4-ethylenedioxythiophene):poly(styrenesulfonate) films using ionic liquids," J. Mater. Chem. 18:5354-5358.
Fan, B. et al. (2008) "Significant Conductivity Enhancement of Conductive Poly (3,4-ethylenedioxythiophene): Poly(styrenesulfonate) Films by Adding Anionic Surfactants into Polymer Solution," Macromolecules 41:5971-5973.
Hansen, T.S. et al. (2007) "Highly Stretchable and Conductive Polymer Material Made from Poly(3,4-ethylenedioxythiophene) and Polyurethane Elastomers," Adv. Funct. Mater. 17:3069-3073.
International Search Report and Written Opinion (ISA/KR) in International Application No. PCT/US2017/013538, dated Apr. 28, 2017.
Lipomi, D.J. et al. (2012) "Electronic Properties of Transparent Conductive Films of PEDOT:PSS on Stretchable Substrates," Chem. Mater. 24(2):373-382.
Noh, J-S. (2014) "Highly conductive and stretchable poly(dimethylsiloxane):poly(3,4-ethylenedioxythiophene): poly(styrene sulfonic acid) blends for organic interconnects," RSC Adv. 4:1857-1863.
Oh, J.Y. et al. (2016) "Conducting Polymer Dough for Deformable Electronics," Adv. Mater. 28(22):4455-4461.
Ouyang, J. et al. (2004) "On the mechanism of conductivity enhancement in poly(3,4-ethylenedioxythiophene):poly(styrene sulfonate) film through solvent treatment," Polymer 45:8443-8450.
Savagatrup, S. et al. (2015) "Plasticization of PEDOT:PSS by Common Additives for Mechanically Robust Organic Solar Cells and Wearable Sensors," Adv. Funct. Mater. 25(3):427-436.
Shi, H. et al. (2015) "Effective Approaches to Improve the Electrical Conductivity of PEDOT:PSS: A Review," Adv. Electron. Mater. 1:1500017, 1-16.
Xia, Y. et al. (2009) "Salt-Induced Charge Screening and Significant Conductivity Enhancement of Conducting Poly(3,4-ethylenedioxythiophene):Poly(styrenesulfonate)," Macromolecules 42:4141-4147.
Xia, Y. et al. (2010) "Highly conductive PEDOT:PSS films prepared through a treatment with zwitterions and their application in polymer photovoltaic cells," J. Mater. Chem. 20:9740-9747.
Xia, Y. et al. (2010) "Significant Conductivity Enhancement of Conductive Poly(3,4-ethylenedioxythiophene): Poly(styrenesulfonate) Films through a Treatment with Organic Carboxylic Acids and Inorganic Acids," ACS Applied Materials & Interfaces 2(2):474-483.
Xia, Y. et al. (2012) "Highly conductive poly(3,4-ethylenedioxythiophene):poly(styrene sulfonic acid) films treated with an amphiphilic fluoro compound as the transparent electrode of polymer solar cells," Energy Environ. Sci. 5:5325-5332.
International Preliminary Report on Patentability for PCT Application No. PCT/US2017/013538 dated Jul. 26, 2018, 10 pages.

* cited by examiner

, where X = CF$_3$SO$_3^-$

, where n = 2-200

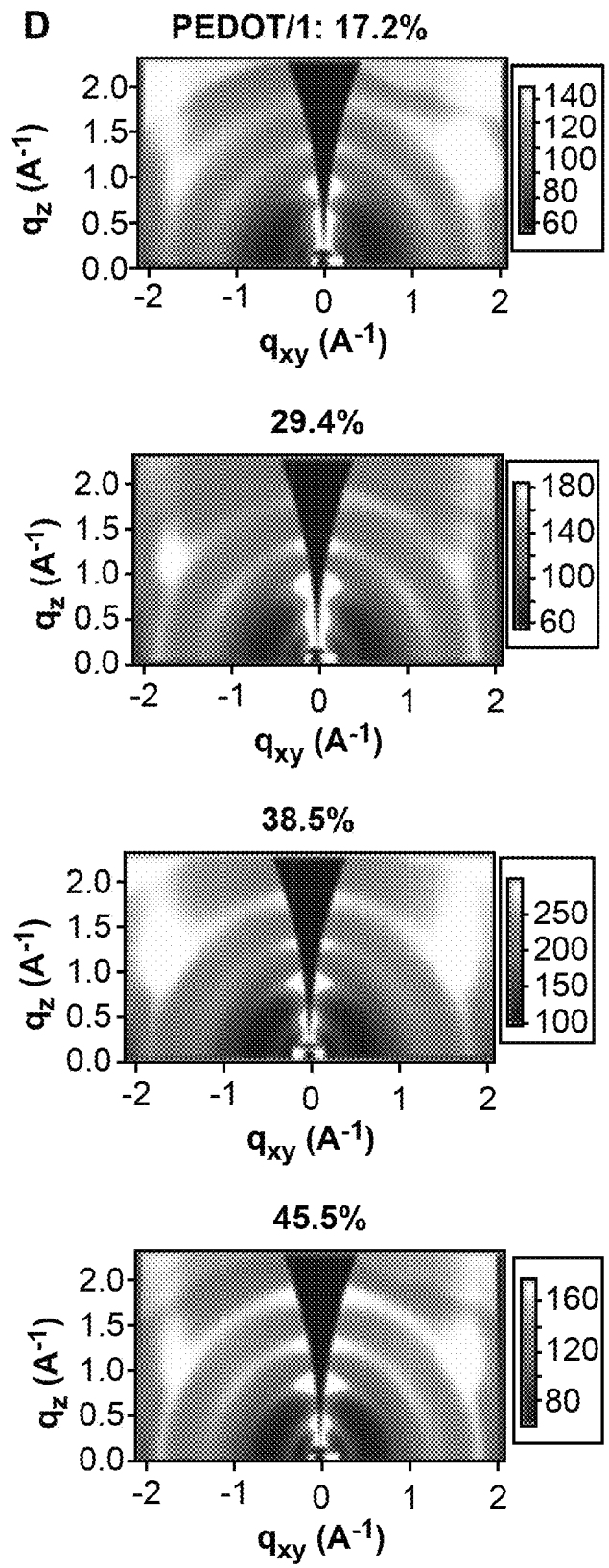
FIG. 12 (Cont. 1)

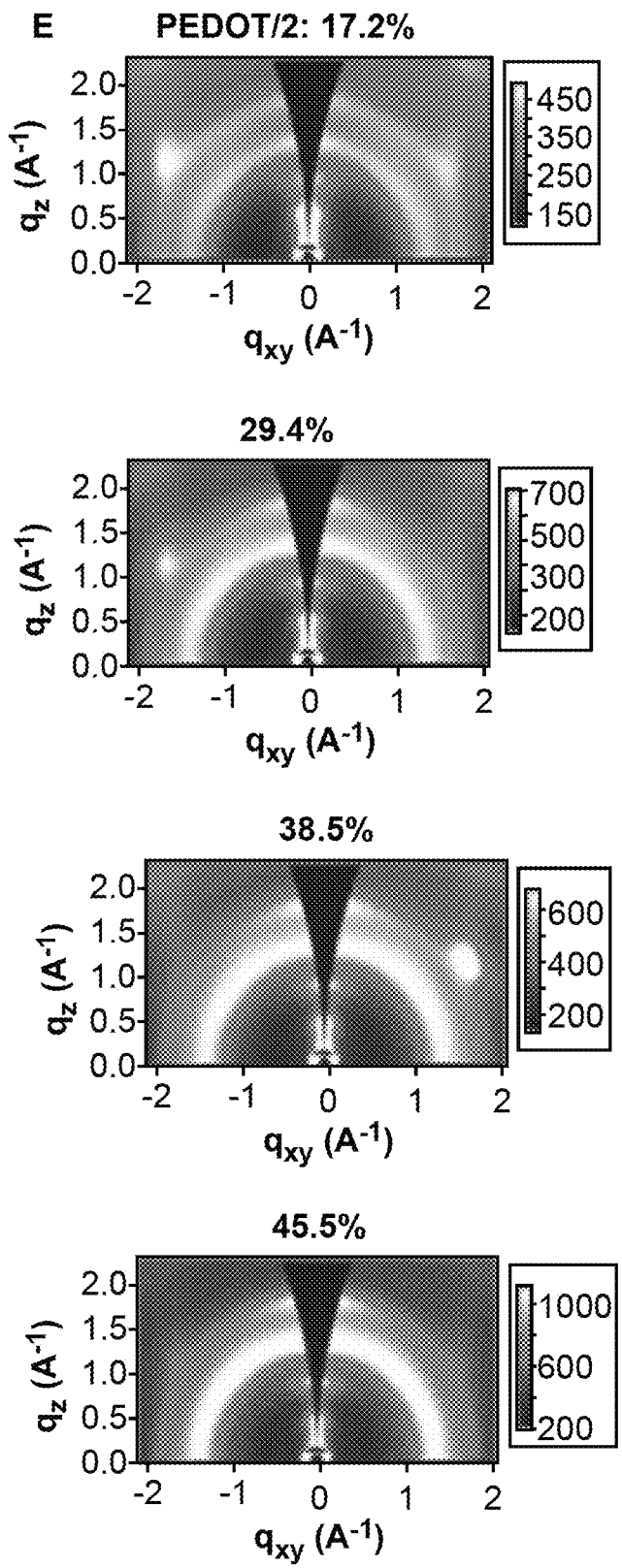
FIG. 12 (Cont. 2)

HIGHLY STRETCHABLE, TRANSPARENT, AND CONDUCTIVE POLYMER

CROSS-REFERENCE TO RELATED APPLICATIONS

This application is a national stage entry under 35 U.S.C. § 371 of International Application No. PCT/US2017/013538, filed Jan. 13, 2017, which claims the benefit of U.S. Provisional Application No. 62/279,561, filed Jan. 15, 2016, and the benefit of U.S. Provisional Application No. 62/433,024, filed Dec. 12, 2016, the contents of which are incorporated herein by reference in their entirety.

BACKGROUND

Recent advancements in stretchable electronics have blurred the interfaces between human and machine. Devices such as epidermal electronics, implantable sensors, and hemispherical eye cameras rely on the intimate contact between devices and curvilinear surfaces of various biological systems, while operating with stability under up to about 100% strain. The most successful concept leading to such devices builds upon linking rigid islands of active components (e.g., transistors, LEDs, photovoltaics) with stretchable interconnects. Hence, developing conductors that can retain good electrical performance under high mechanical strain is desired.

Stretchable conductors have been fabricated via two main routes: strain engineering and nanocomposites. In the first approach, non-stretchable inorganic materials, such as metals, are geometrically patterned into wavy lines that can be extended when an underneath elastomer substrate is stretched. Alternatively, depositing a thin layer of conducting materials such as metals, carbon nanotubes, or graphene on a pre-strained substrate leads to the formation of periodic buckles upon releasing of the strain, which allows the materials to accommodate further cycles of stretching up to the initial pre-strained value. A kirigami design or microcracks have also been applied to sheets of flexible materials to allow macroscopic stretching motion. These methods demonstrate the possibility of transforming rigid materials into stretchable materials while maintaining their electrical properties. However, the fabrication methods involved are usually complicated, and it is challenging to achieve high device density due to large geometric patterns involved for high stretchability. In addition, the buckling and kirigami methods lead to out-of-plane patterns, which can be difficult to encapsulate and disadvantageous for devices that specify planar interfaces or lower profiles.

Embedding a conductive filler in an insulating elastomeric matrix to form a nanocomposite is the second major route towards stretchable conductors. Typically, one-dimensional (1-D) materials such as carbon nanotubes (CNTs) or silver nanowires (AgNWs) are chosen as conductive fillers due to their high aspect ratios. Metal nanoparticles or flakes have also been shown to be good filler materials under specific conditions due to their ability to self-organize upon stretching. Despite the versatility and large number of material choices, the percolation-dependent conductivity is highly strain sensitive and remains a hurdle for device miniaturization and cycling stability.

It is against this background that a need arose to develop embodiments of this disclosure.

SUMMARY

Past breakthroughs in stretchable electronics stem from strain engineering and nanocomposite approaches. Routes towards intrinsically stretchable molecular materials remain desired, as these materials can allow streamlined fabrication processes such as direct printing and coating, mechanically robust devices, and more intimate contact with objects. Here, some embodiments are directed to a highly stretchable conducting polymer, realized with a range of enhancers that serve dual functions to change morphology and as conductivity enhancing dopants in poly(3,4-ethyl enedioxythiophene):poly(styrenesulfonate) (PEDOT:PSS). The polymer films exhibit conductivities comparable to the best reported values for PEDOT:PSS with over about 3100 S/cm at 0% strain and about 4100 S/cm under about 100% strain— among the highest for reported stretchable conductors. It is highly durable under cyclic loading with the conductivity maintained at about 3600 S/cm even after about 1000 cycles to about 100% strain. The conductivity remained above about 100 S/cm at about 600% strain, with a fracture strain as high as about 800% (or more), which is superior to even the best AgNW- or CNT-based stretchable conductor films. The combination of excellent electrical and mechanical properties allowed it to serve as interconnects for field-effect transistor (FET) arrays with device density five times higher than typical lithographically-patterned wavy interconnects.

In some embodiments, a polymer composition includes a conductive polymer and at least one stretchability and electrical conductivity (STEC) enhancer, wherein a content of the STEC enhancer in the composition is at least about 1 wt. % of the composition.

In some embodiments, the conductive polymer is poly(3,4-ethylenedioxythiophene):polystyrene sulfonate.

In some embodiments, the STEC enhancer is an ionic liquid or an ionic compound.

In some embodiments, the STEC enhancer is selected from:

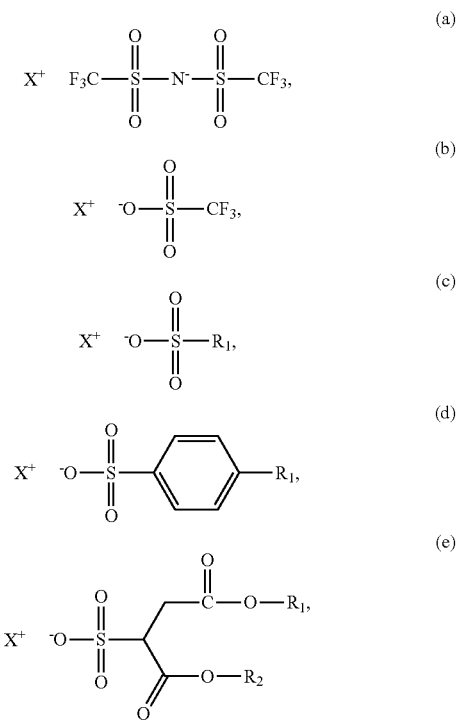

-continued

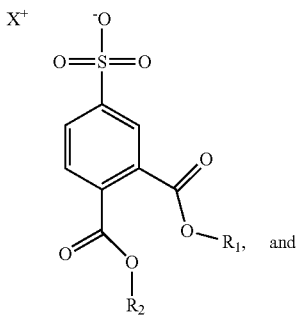

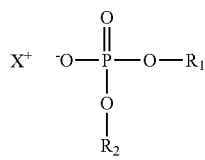

wherein $R_1$ includes (1) a linear or branched alkyl group; (2) a linear or branched alkyl ether group; (3) a linear or branched alkyl ester group; or (4) an aryl group;

$R_2$ includes (1) a linear or branched alkyl group; (2) a linear or branched alkyl ether group; (3) a linear or branched alkyl ester group; or (4) an aryl group; and $R_1$ and $R_2$ can be the same or different.

In some embodiments, $X^+$ is selected from:

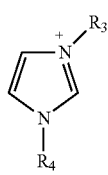

wherein $R_3$ includes (1) a linear or branched alkyl group; (2) a linear or branched alkyl ether group; (3) a linear or branched alkyl sulfonate group; (4) a linear or branched alkyl sulfonic acid group; or (5) a linear or branched alkyl ester group;

$R_4$ includes (1) a linear or branched alkyl group; (2) a linear or branched alkyl ether group; (3) a linear or branched alkyl sulfonate group; (4) a linear or branched alkyl sulfonic acid group; or (5) a linear or branched alkyl ester group; and $R_3$ and $R_4$ can be the same or different, (ii) $H^+$, (iii) a monovalent, divalent, or multivalent metal ion, and (iv) ammonium ion with linear or branched alkyl or alkyl ether groups.

In some embodiments, the STEC enhancer is selected from:

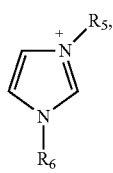

wherein

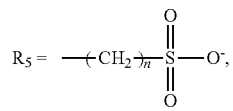

$n=1-8$; and $R_6$ includes (1) a linear or branched alkyl group; (2) a linear or branched alkyl ether group; or (3) a linear or branched alkyl ester group.

In some embodiments, the content of the STEC enhancer is in a range of about 10 wt. % to about 80 wt. % of the composition.

In some embodiments, the STEC enhancer includes a moiety selected from $—(SO_2)—$, $^-O—(SO_2)—$,

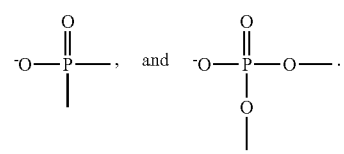

In some embodiments, a manufacturing method includes providing the composition as set forth in the foregoing, and applying the composition to a substrate to form a stretchable conductor over the substrate.

In some embodiments, the stretchable conductor has a conductivity at 0% strain of at least about 1000 S/cm.

In some embodiments, the stretchable conductor has a conductivity at about 100% strain of at least about 1000 S/cm.

In some embodiments, the stretchable conductor has a maximum tensile strain of at least about 50%.

In some embodiments, the method further includes cross-linking the composition to form the stretchable conductor.

In some embodiments, an electronic device includes a stretchable conductor including a polymer composition, which includes a conductive polymer and at least one STEC enhancer, wherein a content of the STEC enhancer in the composition is at least about 1 wt. % of the composition.

In some embodiments, the conductive polymer is poly(3,4-ethylenedioxythiophene): polystyrene sulfonate.

In some embodiments, the STEC enhancer is an ionic liquid or an ionic compound.

In some embodiments, the content of the STEC enhancer is in a range of about 10 wt. % to about 80 wt. % of the composition.

In some embodiments, the STEC enhancer includes a moiety selected from $—(SO_2)—$, $^-O—(SO_2)—$,

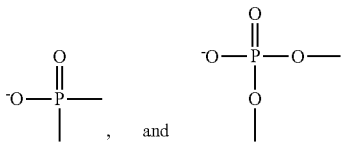

In some embodiments, the electronic device further includes an array of circuit components connected through the stretchable conductor.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DESCRIPTION

In order to achieve a highly stretchable and highly conductive material that is readily solution processable and patternable, an intrinsically stretchable conductor is desirable. Conducting polymers are good candidates due to the flexibility in tuning their molecular structures, electrical and mechanical properties. Their solution processability offers additional advantages for large-scale production of flexible electronics. Unfortunately, high conductivity and high stretchability have not been achieved simultaneously for conducting polymers.

Generally, to achieve high conductivity, high crystallinity and low insulating content are involved. However, in order to render a polymer film stretchable, a high degree of disorder with chain folding is advantageous to create a large free volume for polymer chain movement and unfolding when being stretched. Poly(3,4-ethylenedioxythiophene): poly(styrenesulfonate) (PEDOT:PSS) has the highest reported conductivity among solution processed polymers, but has a fracture strain as low as about 5%. Other efforts to allow the stretching of PEDOT:PSS include incorporating plasticizers such as Zonyl or Triton. However, the enhanced stretchability often results in much lower conductivities, and the value further decreases with the application of strain. As yet, a value is 550 S/cm at 0% strain and a conductivity of 13 S/cm at the fracture strain of 188% can be attained. Hence, such materials generally have been used as pressure or strain sensors where a large change in electrical signal upon strain is desirable, but they fail to serve as interconnects. Interconnects for various rigid electrical components in circuits specify an intrinsically stretchable conducting polymer with conductivity >about 1000 S/cm at >about 100% strain and little temperature dependence.

Figure 1:
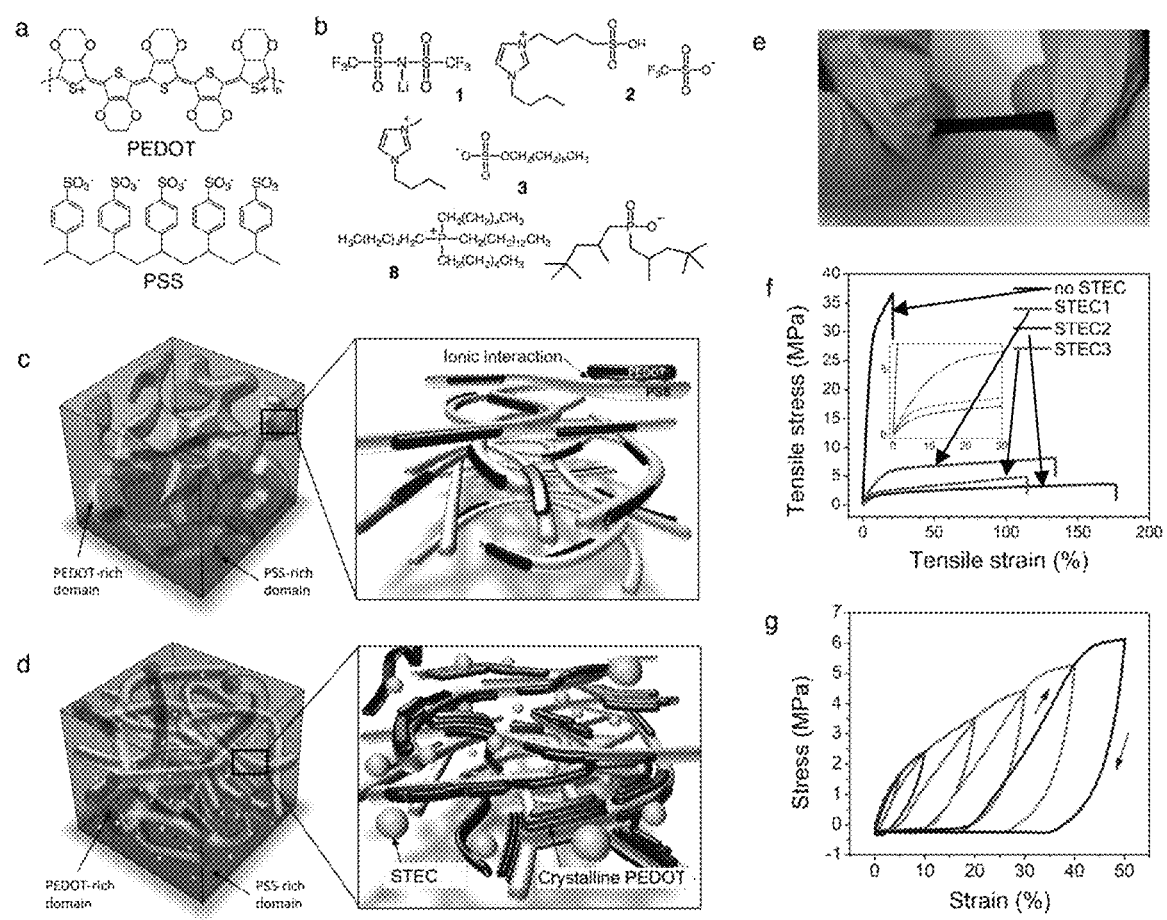
FIG. 1: Chemical structures and schematic representation. (a) Chemical structures of PEDOT:PSS and (b) representative STEC enhancers. (c) Schematic diagram representing the morphology of a typical PEDOT:PSS film vs. (d) that of a stretchable PEDOT film with STEC enhancers. (e) Picture showing a freestanding PEDOT/STEC film being stretched. (f) and (g) Stress/strain and strain cycling behavior of freestanding PEDOT/STEC films, respectively.

In some embodiments of this disclosure, an approach is demonstrated for creating highly stretchable and highly conductive PEDOT films with high cycling stability by incorporating ionic liquid assisted stretchability and electrical conductivity (STEC) enhancers (FIG. 1a, b). Remarkably, the resulting PEDOT:PSS films are both highly conductive and stretchable (over about 4100 S/cm at about 100% strain), giving rise to transistor arrays up to five times higher (or more) in island-to-interconnect ratio as compared to those using wavy metal interconnects.

It is rationalized that high stretchability specifies polymer films with both hard and soft domains, as with hydrogenated styrene butadiene block copolymers (SEBS) or polyurethane elastomers. Unfortunately, both PEDOT and PSS are semicrystalline polymers with no observable glass transition temperatures. Therefore, the STEC enhancers should partially soften polymer chains to create soft domains to achieve high fracture strain. To promote a high conductivity, it is desired to have good connectivity between PEDOT-rich domains, which specifies a weakened electrostatic interaction between PEDOT and PSS to allow PEDOT domains to partially aggregate to form a "hard" conductive network inside a soft PSS matrix (FIG. 1d). An improved approach is demonstrated in which STEC enhancers soften the PSS domains, promote better connectivity and higher crystallinity in PEDOT regions while further enhancing its electrical conductivity through doping.

Figure 8:
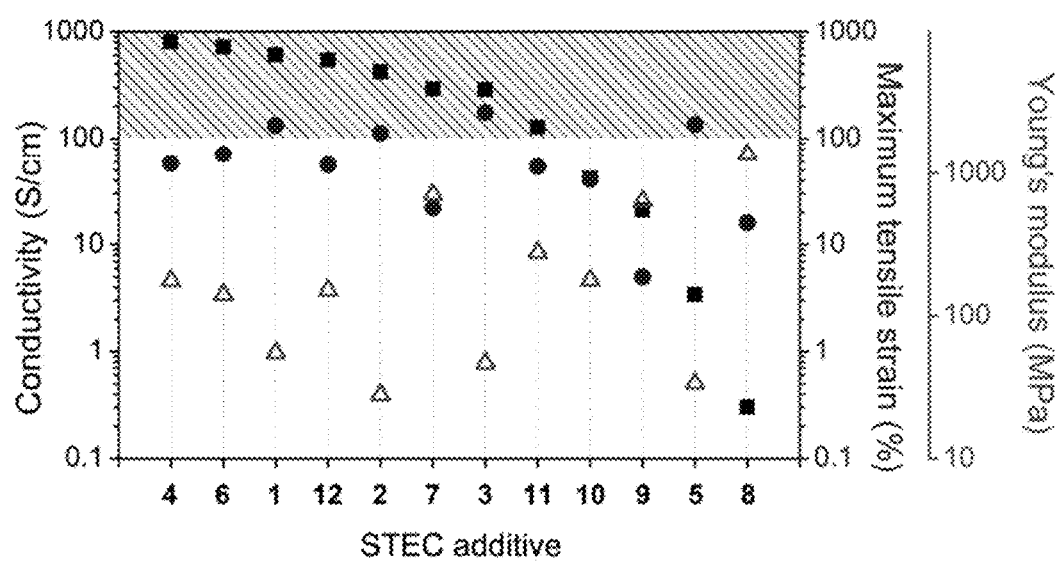
FIG. 8: Plot summarizing the conductivity, maximum tensile strain, and Young's modulus for free-standing PEDOT:PSS films (about 150 µm in thickness) with all additives investigated in this example. The additives (STECs 1, 2, and 3) that simultaneously led to conductivity above about 100 S/cm and maximum tensile strain over about 100% were chosen for detailed investigation. The trends in these three parameters reveal that additives with bulky, long hydrocarbon side chains such as STECs 7-9 do not plasticize PEDOT:PSS to a significant extent due to their high hydrophobicity. The mixtures have high Young's moduli and low maximum tensile strains. Anions such as bis(trifluoromethylsulfonyl)imide (TFMSI) or triflate are highly acidic, and hence serve as effective dopants for PEDOT. Additives containing such anions, such as STECs 1, 2, 4, 6 and 7, lead to highly conductive PEDOT:PSS films even with up to about 45.5 wt. % STEC, while less acidic dopants like phosphinate (STEC 8) result in little conductivity enhancement. Note that although the anion of STEC 9 is also TFMSI, the high hydrophobicity of the pyridinium cation constrains its solubility in water, hence has low effect on film conductivity.

A number of effective STEC enhancers are identified, including ionic compounds such as dioctyl sulfosuccinate sodium salt (DSSS), sodium dodecylbenzenesulfonate (DBSS), dodecylbenzenesulfonic acid (DBSA), and ionic liquids (Table 1 and FIG. 8). Various of these molecules possess sulfonate or sulfonimide anions, which are effective dopants for conducting polymers including PEDOT. Evaluation is performed on ionic liquids, and these compounds effectively reduce Young's moduli of PEDOT:PSS bulk film by as much as about 50 times and render it highly extensible, but also preserve or increase the conductivity (Table 1 and FIG. 8).

A synergistic effect on both conductivity and stretchability can be achieved when the STEC enhancers satisfy the following two characteristics: (1) good solubility in water and the PEDOT:PSS matrix, and (2) highly acidic anions that can act as effective dopants for PEDOT. Through the evaluation of electrical and mechanical properties of free-standing PEDOT/STEC films, it is found that STEC 1, 2, and 3 (FIG. 1a) lead to both high conductivity and good stretchability (FIG. 1e, f, Supplemental Section 1, 2). Even with as high as about 40-50 wt. % incorporation of STEC enhancers, the rheological characteristics of the bulk films behave like viscoelastic solids (FIG. 1g, Supplemental Section 1, 2).

More generally, some embodiments are directed to a class of additives that can render polymers both highly stretchable and highly conductive. These additives can serve the functions of STEC enhancers for conductive polymers. These additives can lower the Young's modulus, increase the maximum tensile strain, and also increase the conductivity for conductive polymer films.

In some embodiments, a general structure of STEC enhancers that can serve as plasticizers and dopants include ionic liquids and ionic compounds represented by the following:

1. Compounds that Contain the Following Anions and Cations:

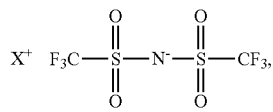
(a)

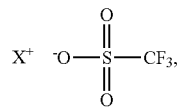
(b)

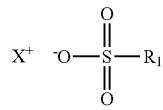
(c)

where $R_1$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (4) an aryl group, such as containing 5 to 20, 5 to 14, or 5 to 10 carbon atoms, optionally containing 1, 2, 3, 4, or more heteroatoms, and optionally substituted with 1, 2, 3, 4, or more halogen atoms, such as fluorine atoms,

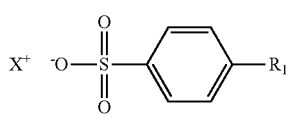
(d)

where $R_1$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (4) an aryl group, such as containing 5 to 20, 5 to 14, or 5 to 10 carbon atoms, optionally containing 1, 2, 3, 4, or more heteroatoms, and optionally substituted with 1, 2, 3, 4, or more halogen atoms, such as fluorine atoms,

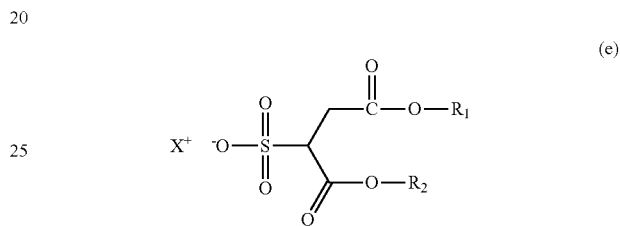
(e)

where $R_1$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (4) an aryl group, such as containing 5 to 20, 5 to 14, or 5 to 10 carbon atoms, optionally containing 1, 2, 3, 4, or more heteroatoms, and optionally substituted with 1, 2, 3, 4, or more halogen atoms, such as fluorine atoms;

where $R_2$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (4) an aryl group, such as containing 5 to 20, 5 to 14, or 5 to 10 carbon atoms, optionally containing 1, 2, 3, 4, or more heteroatoms, and optionally substituted with 1, 2, 3, 4, or more halogen atoms, such as fluorine atoms; and $R_1$ and $R_2$ can be the same or different,

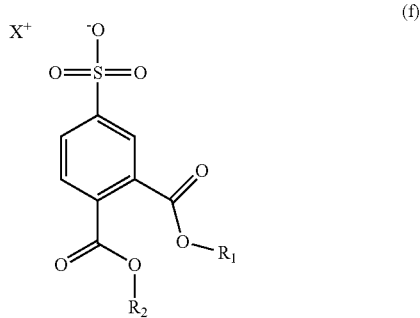

(f)

where $R_1$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (4) an aryl group, such as containing 5 to 20, 5 to 14, or 5 to 10 carbon atoms, optionally containing 1, 2, 3, 4, or more heteroatoms, and optionally substituted with 1, 2, 3, 4, or more halogen atoms, such as fluorine atoms;

where $R_2$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (4) an aryl group, such as containing 5 to 20, 5 to 14, or 5 to 10 carbon atoms, optionally containing 1, 2, 3, 4, or more heteroatoms, and optionally substituted with 1, 2, 3, 4, or more halogen atoms, such as fluorine atoms; and $R_1$ and $R_2$ can be the same or different, and

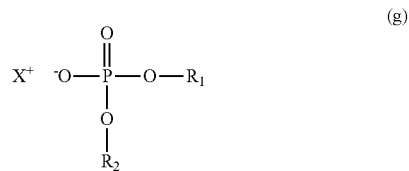

(g)

where $R_1$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (4) an aryl group, such as containing 5 to 20, 5 to 14, or 5 to 10 carbon atoms, optionally containing 1, 2, 3, 4, or more heteroatoms, and optionally substituted with 1, 2, 3, 4, or more halogen atoms, such as fluorine atoms;

where $R_2$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (4) an aryl group, such as containing 5 to 20, 5 to 14, or 5 to 10 carbon atoms, optionally containing 1, 2, 3, 4, or more heteroatoms, and optionally substituted with 1, 2, 3, 4, or more halogen atoms, such as fluorine atoms; and $R_1$ and $R_2$ can be the same or different.

For (e) to (g), $R_1$ and $R_2$ can be covalently bonded together, directly or indirectly through a linker group.

For (a) to (g), either, or both, $R_1$ and $R_2$ can be part of an oligomer or a polymer.

For (a) to (g), the cations and the anions can be covalently bonded together, directly or indirectly through a linker group, to yield Zwitterion compounds.

In addition to (a) to (g) above, other compounds that contain anions containing —($SO_2$)—, $^-$O—($SO_2$)—,

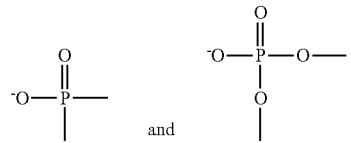

are encompassed by this disclosure.

For (a) to (g), the cation $X^+$ can be any of the following:

(i)

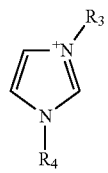

where $R_3$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl sulfonate group, such as represented as —$SO_2$—O—R or -L-$SO_2$—O—R, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (4) a linear or branched alkyl sulfonic acid group, such as represented as -L-$SO_2$—OH, with L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (5) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; and an alkylene group containing 1 to 10, 1 to 8, 1 to 6, 1 to 4, or 1 to 2 carbon atoms, and optionally substituted with 1, 2, 3, 4, or more halogen atoms;

where $R_4$ is, or contains, (1) a linear or branched alkyl group, such as containing 1 to 10, 1 to 8, 1 to 6, 1 to 4, or 1 to 2 carbon atoms, optionally containing 1, 2, 3, 4, or more heteroatoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (3) a linear or branched alkyl sulfonate group, such as represented as —$SO_2$—O—R or -L-$SO_2$—O—R, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; (4) a linear or branched alkyl sulfonic acid group, such as represented as -L-$SO_2$—OH, with L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (5) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; and $R_3$ and $R_4$ can be the same or different, (ii) $H^+$, (iii) a monovalent, divalent, or multivalent metal ion, and (iv) ammonium ion with linear or branched alkyl or alkyl ether groups.

2. Zwitterion Compounds with the Following Structures:

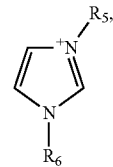

where

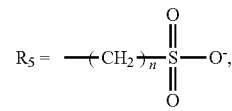

n=1-8, 2-8, 3-8, or 4-8; and where $R_6$ is (1) a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms; (2) a linear or branched alkyl ether group, such as represented as —OR or -L-OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms; or (3) a linear or branched alkyl ester group, such as represented as —(CO)OR or -L-(CO)OR, with R being a linear or branched alkyl group, such as containing 1 to 10, 1 to 8, 1 to 6, 1 to 4, or 1 to 2 carbon atoms, and optionally substituted with 1, 2, 3, 4, or more halogen atoms, such as fluorine atoms, and L being a linker group, such as an alkylene group containing 1 to 10, 1 to 8, 1 to 6, 1 to 4, or 1 to 2 carbon atoms, and optionally substituted with 1, 2, 3, 4, or more halogen atoms.

In some embodiments, suitable ionic additives (e.g., ionic liquids) include those having good solubility in an aqueous or other solvent media for a conductive polymer. For example, a solubility of an ionic additive, at room temperature, can be at least about 1 g of the ionic additive per 100 g of water (or other solvent medium), such as at least about 1.5 g, at least about 2 g, at least about 2.5 g, at least about 3 g, at least about 3.5 g, at least about 4 g, at least about 4.5 g, at least about 5 g, at least about 10 g, at least about 15 g, or at least about 20 g.

In some embodiments, suitable STEC enhancers (e.g., ionic liquids or other ionic additives) include those containing acidic or strongly acidic anions, to yield a doping effect and enhanced conductivity. For example, a pKa of an acid corresponding to an anion (and from which the anion remains after donation of a hydrogen ion), at room temperature in water, can be less than about 3, such as about 2 or less, about 1 or less, about 0 or less, about −1 or less, about −2 or less, or about −3 or less.

In some embodiments, an ionic additive, or a combination of two or more different ionic additives, is mixed or otherwise combined with a conductive polymer, which can be in the form of an aqueous or other solvent medium dispersion, to yield a liquid composition. An example of a conductive polymer is poly(3,4-ethylenedioxythiophene):polystyrene sulfonate or PEDOT:PSS. Another conductive polymer can be used in place of, or in combination with PEDOT:PSS, such as those containing aromatic cyclic groups (e.g., poly(fluorene), polyphenylene, polypyrene, polyazulene, polynaphthalene, poly(pyrrole), polycarbazole, polyindole, polyazepine, polyaniline, poly(thiophene), and poly(p-phenylene sulfide)), those containing double bonds (e.g., poly(acetylene)), and those containing both aromatic cyclic groups and double bonds (e.g., poly(p-phenylene vinylene)). The liquid composition can be molded or can be applied to a substrate by, for example, spin-coating, drop casting, printing, or other coating or liquid deposition technique, and then subjected to thermal annealing or other heating to yield an annealed composition as a stretchable conductor. The stretchable conductor can be in the form of a film, and can be patterned as stretchable electrodes and interconnects.

In some embodiments, a relative content of an ionic additive (e.g., an ionic liquid) in a stretchable conductor, such as in the form of a film, can be in a range of about 0.1 wt. % to about 80 wt. % (solids), such as about 1 wt. % to about 80 wt. %, about 5 wt. % to about 80 wt. %, about 15 wt. % to about 80 wt. %, about 20 wt. % to about 80 wt. %, about 25 wt. % to about 80 wt. %, about 30 wt. % to about 80 wt. %, about 30 wt. % to about 70 wt. %, about 30 wt. % to about 60 wt. %, about 35 wt. % to about 55 wt. %, or about 45.5 wt. %, with a remainder including or consisting essentially of a conductive polymer, to attain a desired balance between high conductivity and high stretchability. In the case of a combination of two or more different ionic additives, a total content of the ionic additives (e.g., ionic liquids) in a stretchable conductor, such as in the form of a film, can be in a range of about 0.1 wt. % to about 80 wt. % (solids), such as about 1 wt. % to about 80 wt. %, about 5 wt. % to about 80 wt. %, about 10 wt. % to about 80 wt. %, about 15 wt. % to about 80 wt. %, about 20 wt. % to about 80 wt. %, about 25 wt. % to about 80 wt. %, about 30 wt. % to about 80 wt. %, about 30 wt. % to about 70 wt. %, about 30 wt. % to about 60 wt. %, about 35 wt. % to about 55 wt. %, or about 45.5 wt. %.

In some embodiments, a stretchable conductor, which can be in the form of a film, can be crosslinked or partially crosslinked using (a) physical crosslinkers or (b) chemical crosslinkers.

Examples of physical crosslinkers include multivalent metal salts, such as iron (III) chloride, gold (III) chloride, magnesium chloride, and other multivalent metal halide salts, among others, with a crosslinker content in a range of about 0.1% to about 20 mol %. In some embodiments, a maximum tensile strain can decrease slightly with the inclusion of a physical crosslinker, but it can remain at or above about 40% strain. A conductivity can remain substantially the same or can increase by several fold for oxidative salts. Specifically, for a salt that is oxidative, regardless of whether it is multivalent or monovalent, a conductivity of a film can increase by 3 folds or more. Examples of oxidative salts include iron (III) chloride, gold (III) chloride, ammonium persulfate, and potassium persulfate, among others. In some embodiments, a maximum tensile strain can decrease slightly with the inclusion of an oxidative salt, but it can remain at or above about 40% strain.

Figure 2:
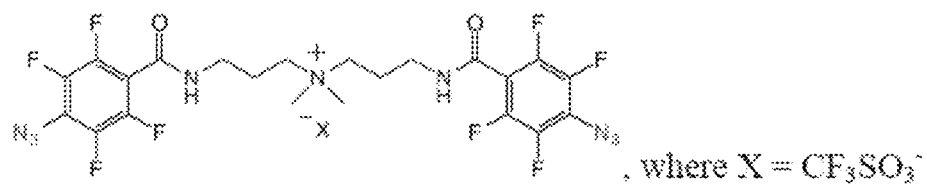
FIG. 2: Examples of chemical crosslinkers.
Figure 2:
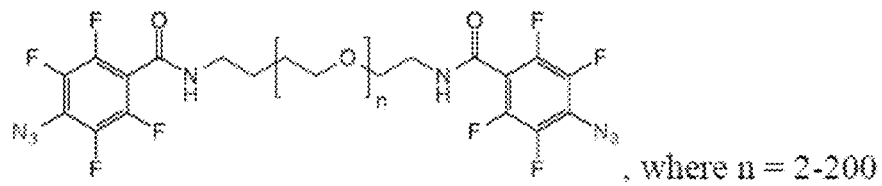
Figure 2:
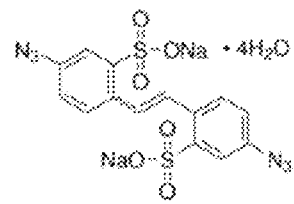
Figure 2:
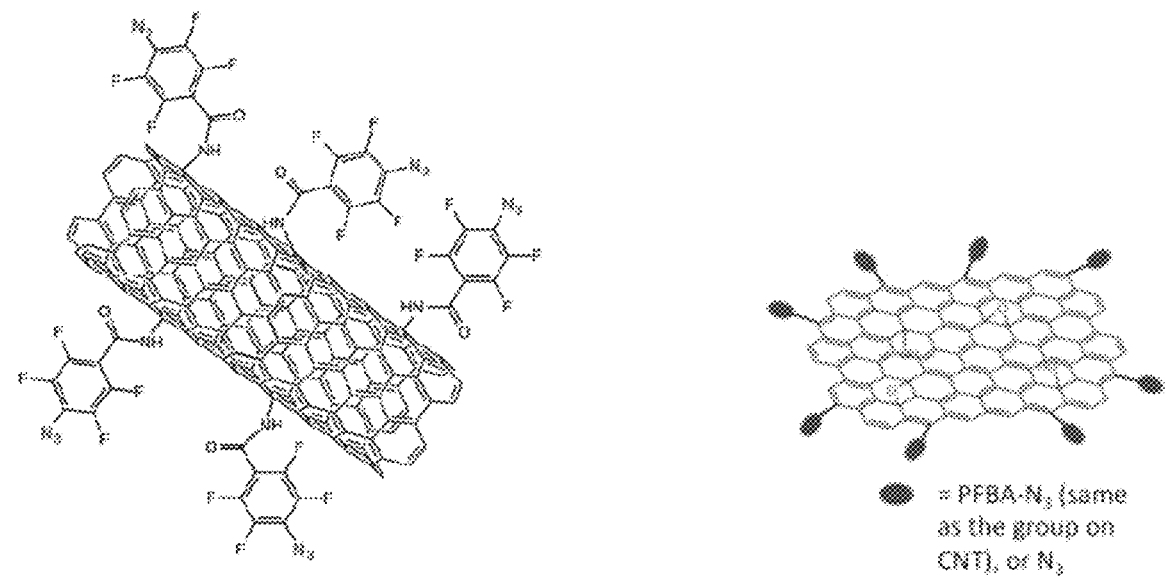

Examples of chemical crosslinkers include water soluble bisazide or perfluorinated bisazide and azide-functionalized carbon nanotube or graphene oxide (see structures in FIG. 2), with a crosslinker content in a range of about 0.1% to about 20 mol %. In some embodiments, a slight decrease in maximum tensile strain can be observed after chemical crosslinking, but it can remain at or above about 40% strain.

In some embodiments, a conductivity of a stretchable conductor at 0% strain can be at least about 500 S/cm, at least about 800 S/cm, at least about 1000 S/cm, at least about 1500 S/cm, at least about 2000 S/cm, at least about 2500 S/cm, or at least about 3000 S/cm, and up to about 4000 S/cm or more, and the conductivity of the stretchable conductor at about 100% strain can be at least about 500 S/cm, at least about 800 S/cm, at least about 1000 S/cm, at least about 1500 S/cm, at least about 2000 S/cm, at least about 2500 S/cm, or at least about 3000 S/cm, and up to about 4000 S/cm or more.

In some embodiments, a maximum tensile strain of a stretchable conductor can be at least about 15%, at least about 20%, at least about 50%, at least about 80%, at least about 100%, at least about 110%, at least about 120%, at least about 130%, at least about 140%, at least about 150%, at least about 160%, or at least about 170%, and up to about 200% or more.

In some embodiments, the Young's modulus of a stretchable conductor can be about 500 MPa or less, about 400 MPa or less, about 300 MPa or less, about 200 MPa or less, about 150 MPa or less, about 100 MPa or less, about 80 MPa or less, or about 50 MPa or less, and down to about 10 MPa or less.

Figure 3A:
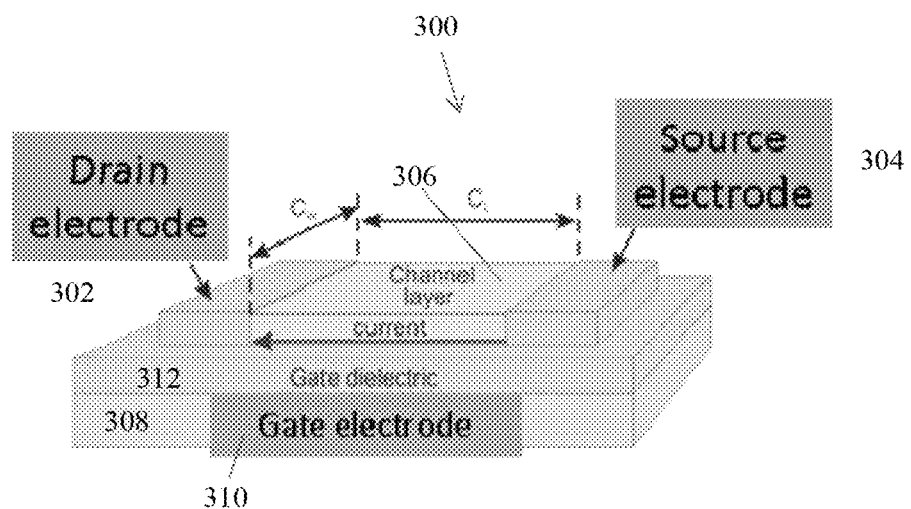
FIG. 3A: Example of an electronic device incorporating a stretchable conductor.

FIG. 3A shows an example of an electronic device 300 incorporating a stretchable conductor. The electronic device 300 is an organic field-effect transistor, including a drain electrode 302, a source electrode 304, a channel layer 306 extending between the drain electrode 302 and the source electrode 304, a substrate 308 including a gate electrode 310, and a gate dielectric layer 312 between the channel layer 306 and the substrate 308. In the shown embodiment, at least one of the source electrode 304, the drain electrode 302, and the gate electrode 310 can be formed of a stretchable conductor of some embodiments of this disclosure.

Figure 3B:
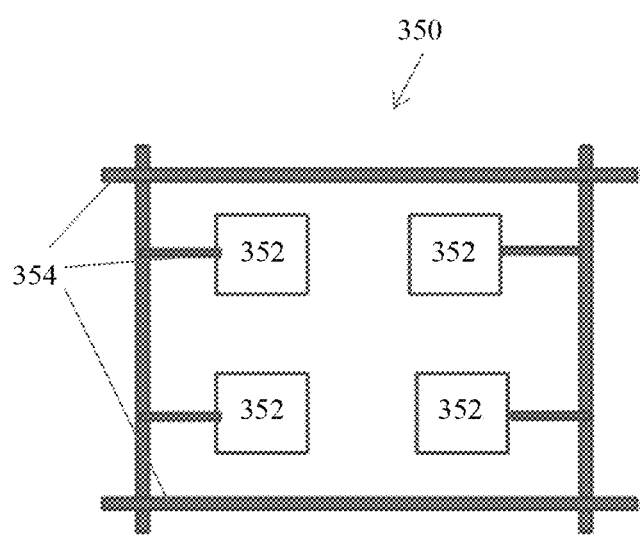
FIG. 3B: Another example of an electronic device incorporating a stretchable conductor.

FIG. 3B shows another example of an electronic device 350 incorporating a stretchable conductor. The electronic device 350 includes an array of circuit components 352, such as transistors or memory devices, which are connected through interconnects 354. In the shown embodiment, the interconnects 354 can be formed of a stretchable conductor of some embodiments of this disclosure.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Highly Conductive and Stretchable PEDOT Film Supported on Elastic Substrates

Figure 4:
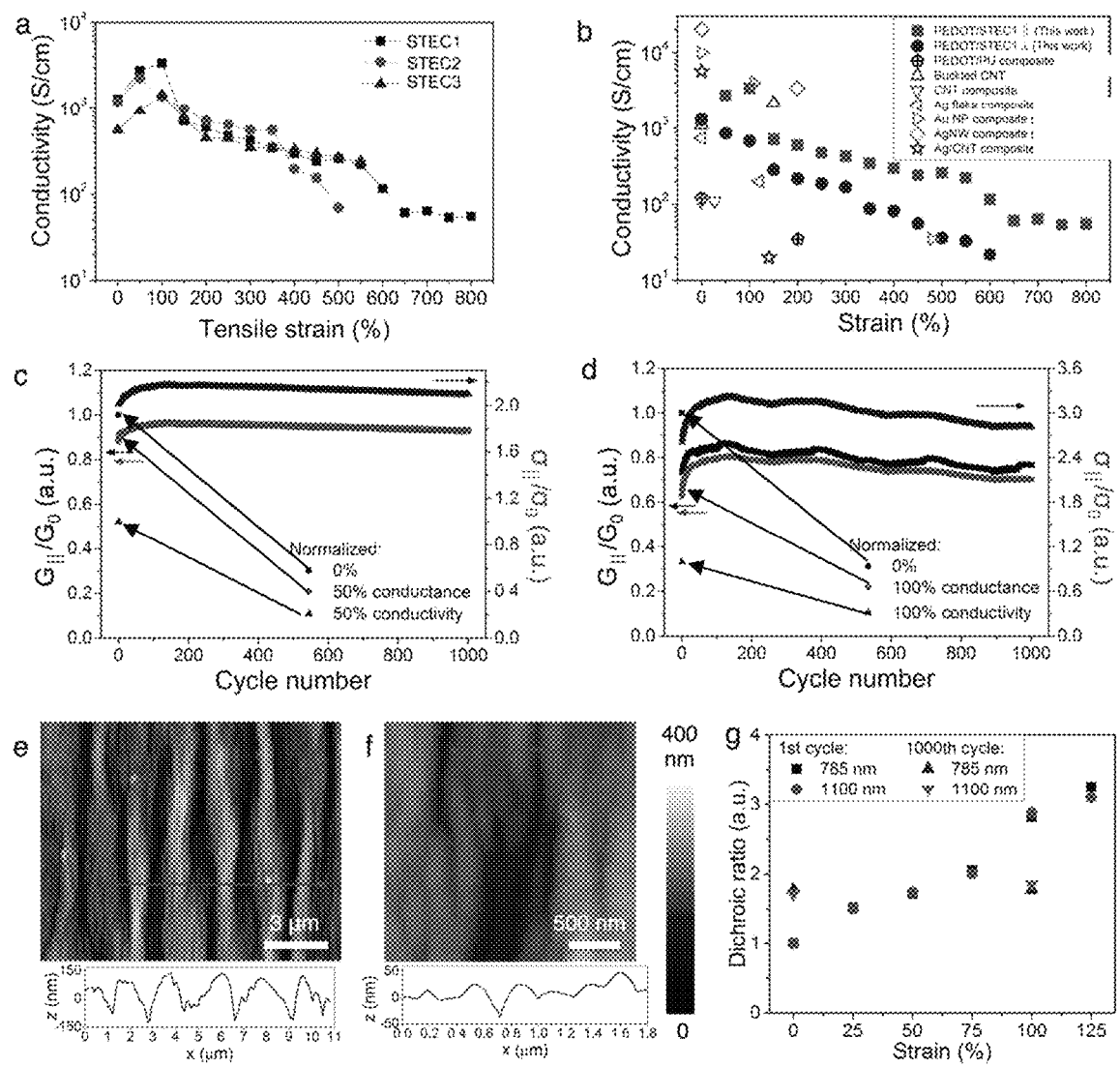
FIG. 4: Electrical and optical properties of stretchable PEDOT under strain. (a) Conductivity under various strains for PEDOT with different STEC enhancers. Film thicknesses are about 600-800 nm. (b) Conductivities under various strain presented in this example compared to other representative stretchable conductors. (c) and (d) Cycling stability of PEDOT/STEC 1 under (c) about 50% and (d) about 100% strain; (e) and (f) are AFM images under different magnifications of a PEDOT/STEC 1 film at 0% strain after it was cycled for 1000 times to about 100% strain. The vertical profile across the line on the image is shown below the corresponding image. The deep folds have an amplitude of about 100 nm and a periodicity of about 1.5 µm; whereas those for the wrinkles are about 20 nm and about 0.25 µm, respectively. (g) Dichroic ratio of the PEDOT/STEC 1 films under different strain calculated at about 785 nm and about 1100 nm for the first and the $1000^{th}$ cycle. No change in dichroic ratio from 0% to about 100% strain after 1000 cycles, potentially due to the folds formed in the film and a steady concentration of STEC enhancers being reached.

Stretchable PEDOT are characterized using thin films directly coated onto SEBS elastic substrates to evaluate their electrical behavior as transparent, thin film electronic components. When stretched, an initial increase in conductivity by almost about 3 times to up to about 3390 S/cm under about 100% strain was observed along the stretching direction ($\sigma\|$) while decreased in the perpendicular direction ($\sigma\bot$) (FIG. 4a, b). A high degree of PEDOT chain alignment was confirmed by polarized UV-vis measurement (FIG. 4g). The dichroic ratios ($A\|/A\bot$) calculated using the absorption of the about 785 nm peak and the free-carrier tail at about 1100 nm both showed a monotonic increase from about 1 under 0% strain to about 3.2 under about 125% strain, which is indicative of chain alignment along the parallel direction to stretching (FIG. 4g). This agrees with the increase in conductivity along this direction (FIG. 4a).

Figure 7:
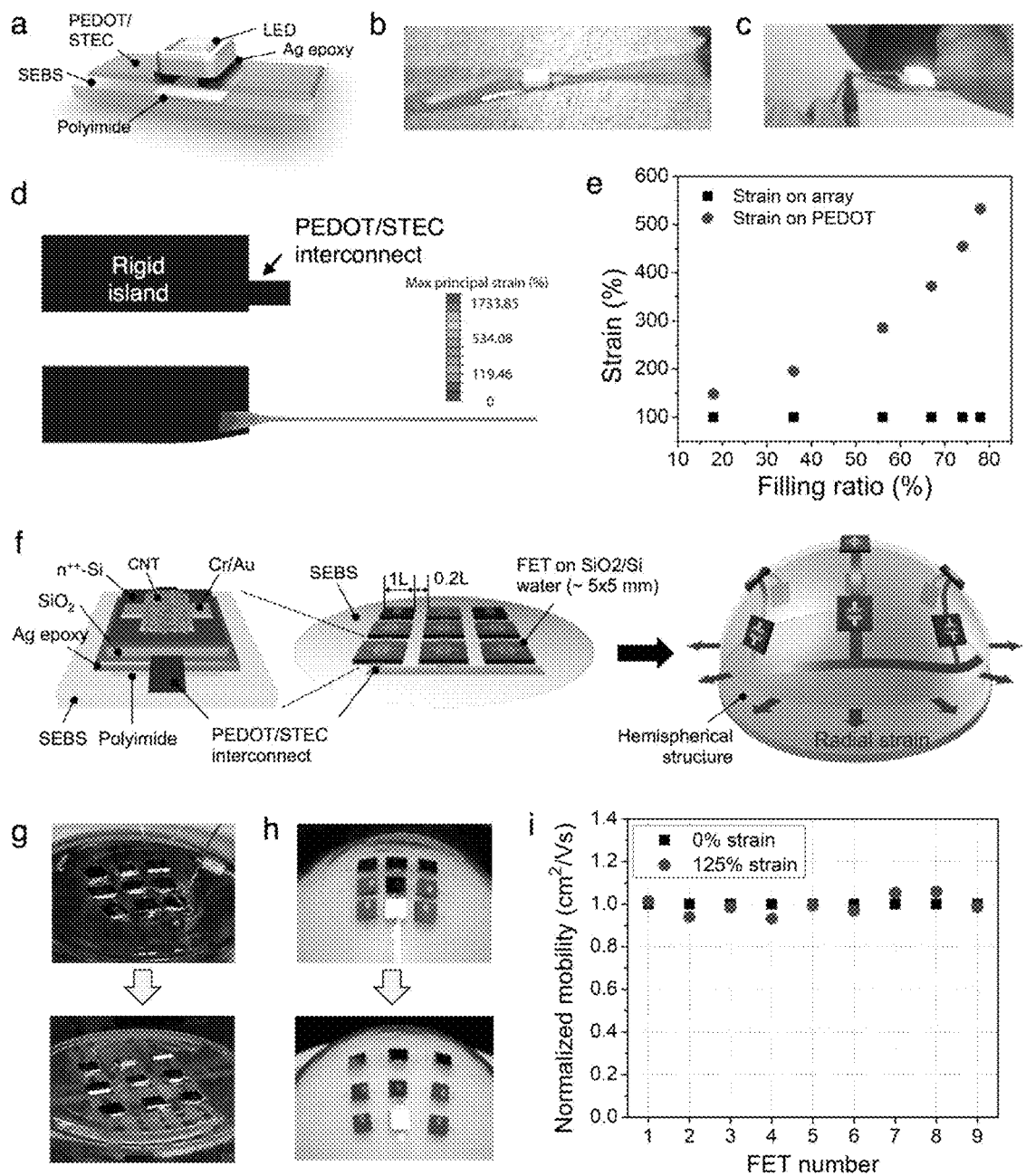
FIG. 7: Stretchable PEDOT/STEC as interconnects for LED and FET devices. (a) Schematic representation of a LED device bridged by PEDOT wires to a power source. (b) and (c) Photographs illustrating little change in LED brightness as the device is stretched under twisting and poked with a sharp object, respectively. (d) Finite element simulation showing the cross-sectional strain distribution of the rigid-island arrays at 0% (top) and about 100% (bottom) strains. (e) Plot summarizing the relationship between array density and strain on PEDOT interconnects when stretching the array to about 100% from the simulation results. (f) Schematic diagram of the rigid-island FET array with stretchable PEDOT interconnects. (g) and (h) Photographs showing the FET array being stretched in all directions on a flat surface and spherical object, respectively. (i) Normalized mobility of individual transistors when the array is stretched to different strains.
Figure 22:
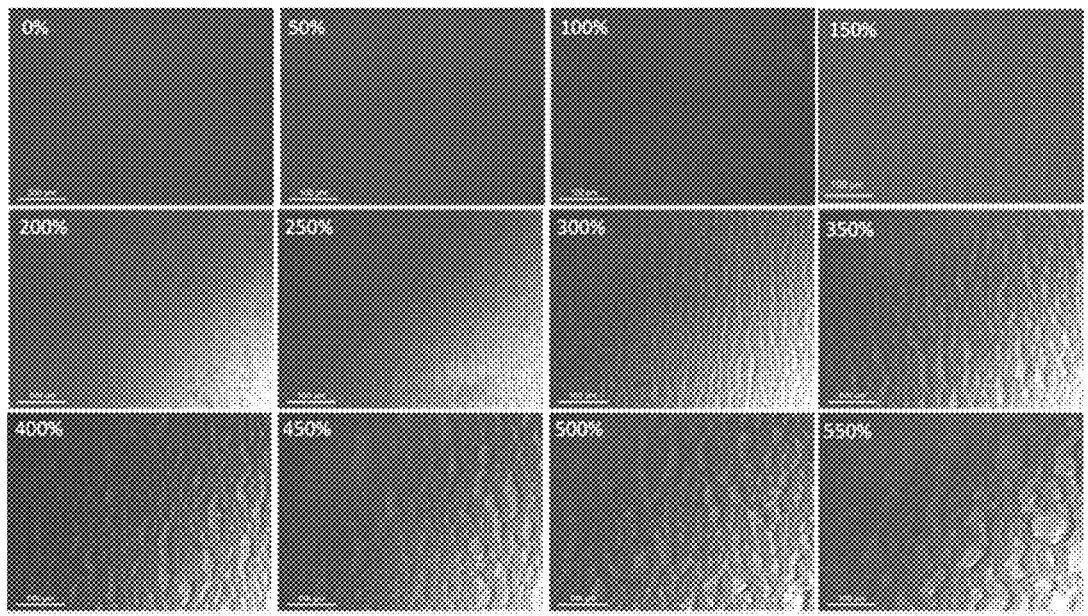
FIG. 22: Optical microscope images of a PEDOT/STEC 1 film supported on a SEBS substrate under various strains.
Figure 23:
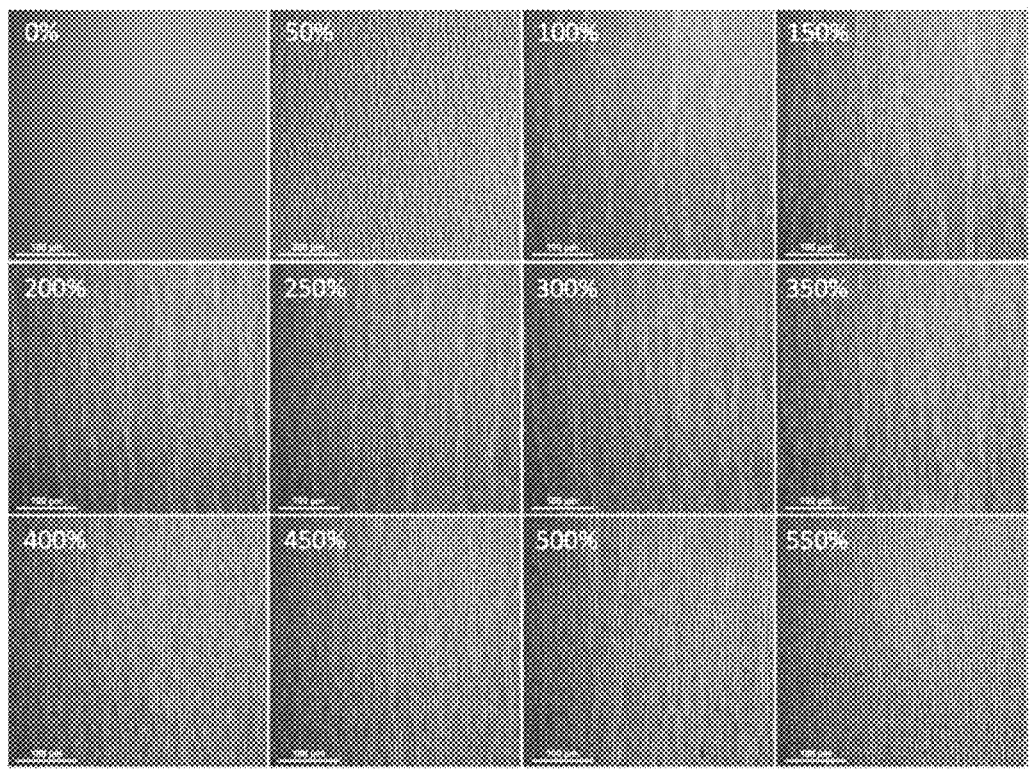
FIG. 23: Optical microscope images of a PEDOT/STEC 1 film supported on a SEBS substrate after being stretched to various strains and returned to its original length. Folds are formed in the film after stretching as seen from AFM in FIG. 23.
Figure 31:
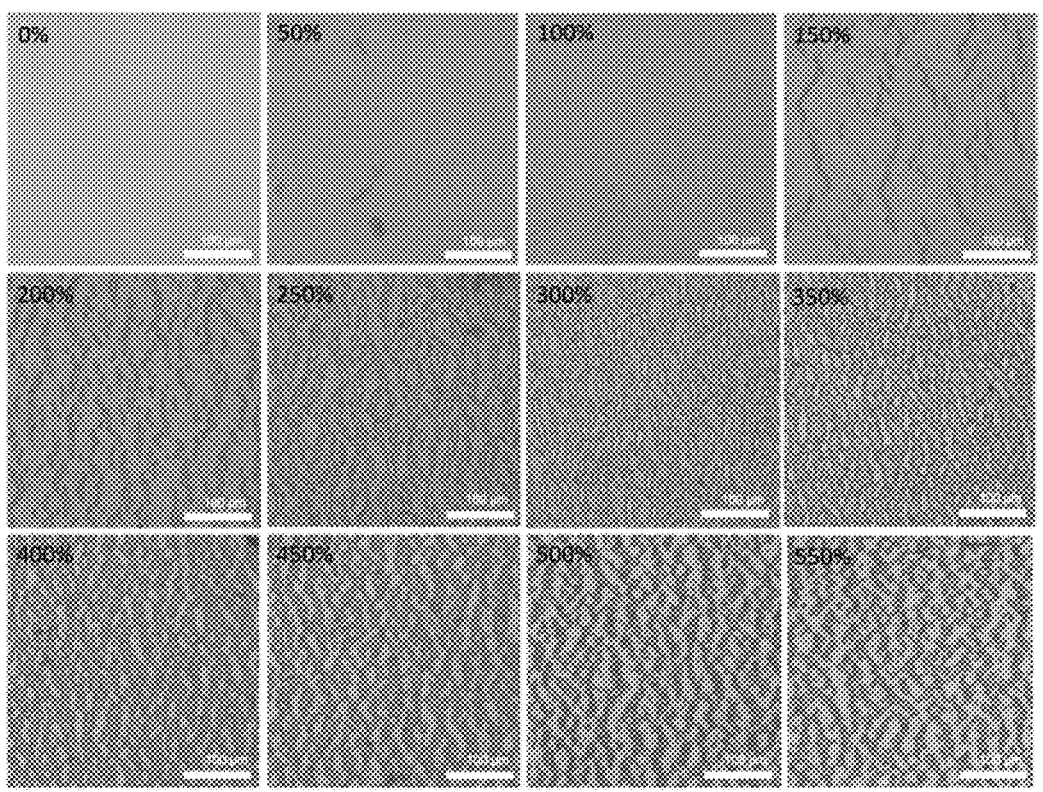
FIG. 31: Optical microscope images of a PEDOT/STEC 2 film held under various tensile strains.
Figure 32:
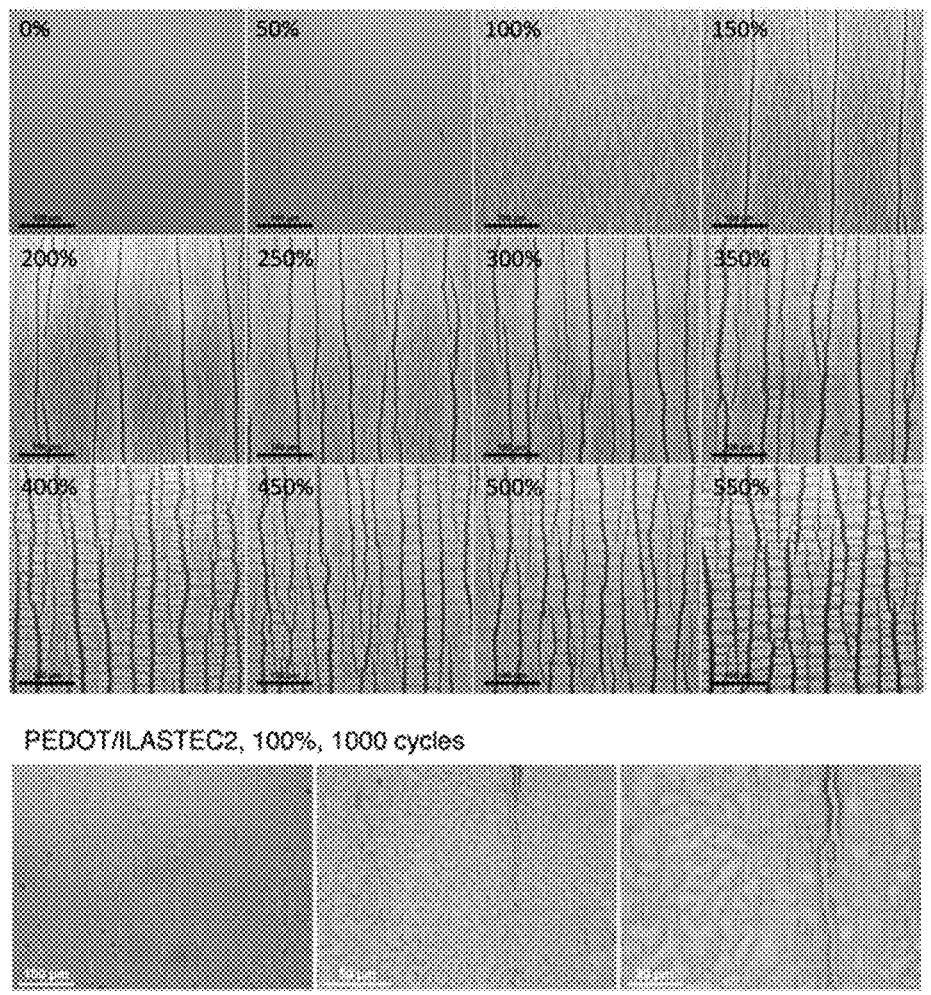
FIG. 32: Optical microscope images of a PEDOT/STEC 2 film after being stretched to the indicated percentage (top panel); optical microscope images at various magnifications of a PEDOT/STEC 2 film after being cycled 1000 times to about 100% are shown in the bottom panel. The rippled patterns visible on the film after about 100% strain are folds, whereas the dark vertical lines that appear beyond about 150% are cracks.

Followed by the initial increase at lower strains, $\sigma\|$ then decreased consistently at strain above about 100% till the substrate ruptured. The best performance is obtained for films with STEC enhancer 1, where the conductivity remained above about 1000 S/cm between about 0%-100% strain with the highest value at about 3390 S/cm at about 100% strain, above about 100 S/cm up to about 600% strain, and had a final conductivity of about 56 S/cm even when stretched to about 800% strain, beyond which point the substrate ruptured. Optical microscope images of the stretchable PEDOT films held under strain show that cracks do not form till about 150% (FIGS. 22 and 31). Even under strains as high as about 550% with a much higher crack density, the films possess morphologies of an interconnected network, which can account for the reasonably high conductivity under high strain. Compared to most other stretchable conductors (FIG. 4b), the material has higher initial conductivity, slower drop in conductivity under tensile strain, and also sustains the highest maximum tensile strain. Note that although a maximum of about 100% strain is specified for wearable or epidermal electronics, a higher stretchability is specified when these materials are used as interconnects for rigid-island device arrays shown later (FIG. 7). In addition, the ability for a material to be elongated to several times its original length greatly broadens its applications to robotics and biomechanical systems under extreme conditions.

Figure 24:
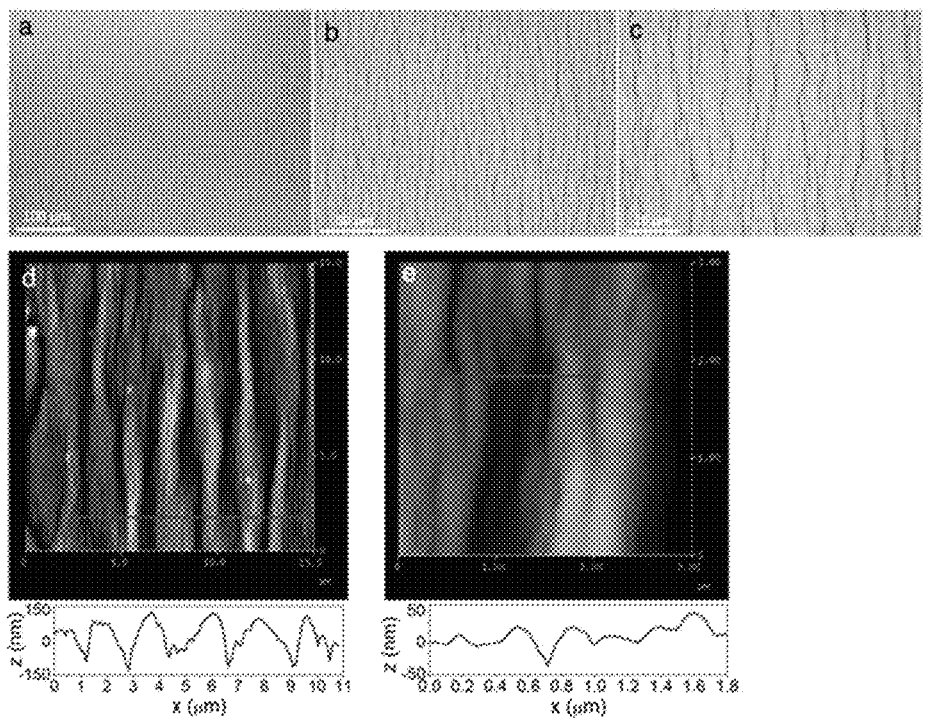
FIG. 24: (a)-(c) Optical microscope images at various magnifications showing a PEDOT/STEC 1 film at 0% strain after cycling 1000 times to about 100% strain. (d) and (e) are the corresponding AFM images showing folds in the film.
Figure 25:
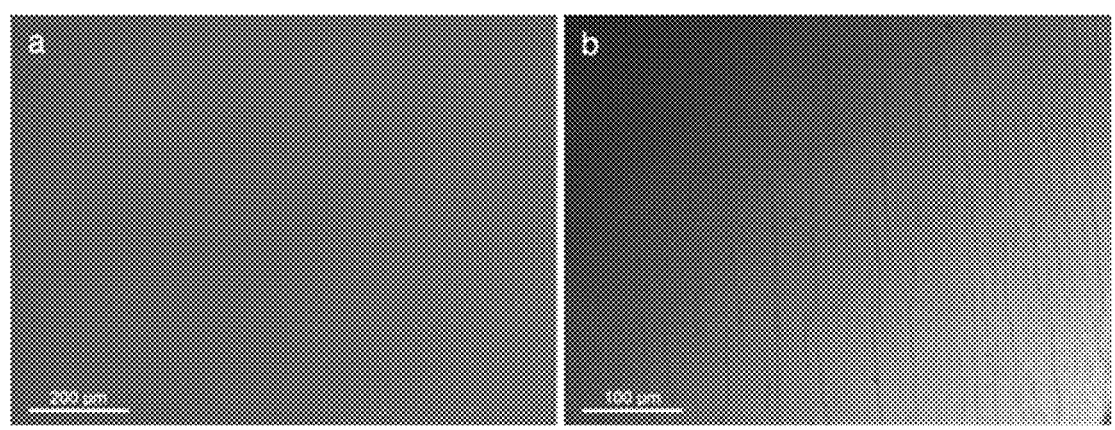
FIG. 25: Optical microscope images of a PEDOT/STEC 1 film upon unloading from about 100% strain. (a) At about 80% strain, and (b) at about 70% strain where wrinkles are seen, indicating the onset of plastic deformation.

The stretchable PEDOT films show high cycling stability. The film conductance G (reflects change in resistance) retained about 92% of its original value at about 50% strain after 1000 cycles and about 71% when the cycling strain is about 100% (FIG. 4c, d). The conductivity ($\sigma\|$) of these films increased with strain due to the chain alignment phenomenon. After 1000 cycles, the films still exhibited an about 2.1- and about 2.8-fold increase in conductivity under about 50% and about 100% strains, respectively, as compared to the unstrained films (FIG. 4c, d). Note that the conductivity exhibited an increase during approximately the first 100 cycles, but then stabilized at a more constant value. At the end of 1000 cycles to about 100% strain, no visible cracks formed on films when inspected by both optical microscope (FIG. 24) and atomic force microscope (AFM) (FIG. 4e, f). The darker lines visible in optical microscope images were revealed to be deep folds by AFM analysis (FIG. 4e, f), demonstrating the excellent durability of the PEDOT/STEC films under repeated strain.

Stretchable PEDOT Film Morphological Characterizations

The STEC enhancers such as 1-3 play a number of roles in PEDOT:PSS in terms of charge transfer doping, crystallinity and morphology.

Figure 5:
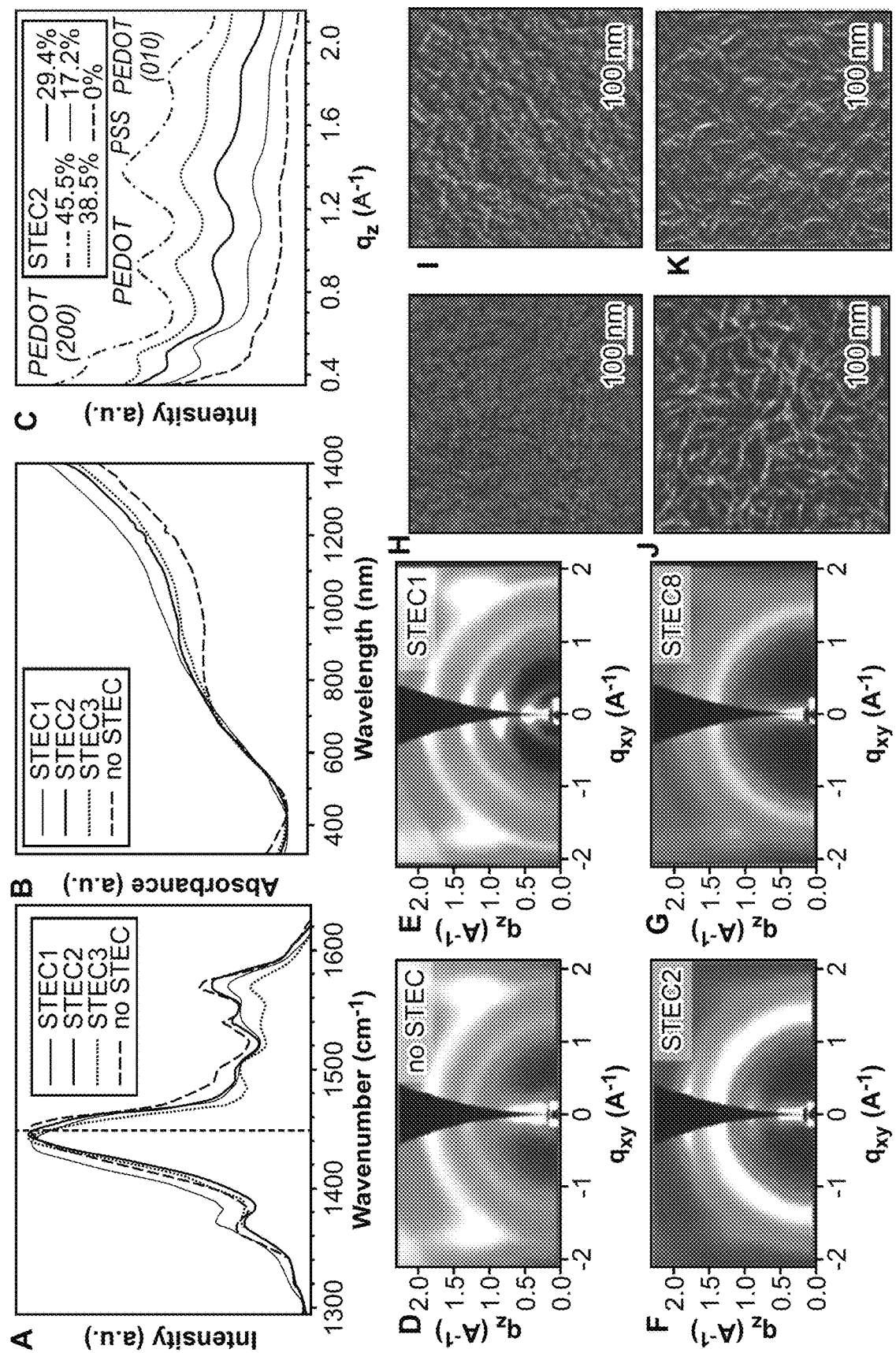
FIG. 5: Chemical and crystallographic characterization of stretchable PEDOT. (a) Raman spectra illustrating the $C_\alpha=C_\beta$ peak position shift for the different films. The dash line indicates the peak position for the PEDOT control film without any STEC. (b) UV-vis-NIR spectra showing the doping effect of STECs on PEDOT as evidenced from increased absorption intensity from bi-polaron delocalization at >about 1000 nm. (c) Near out-of-plane intensity plot of GIWAXS patterns for PEDOT:PSS films with various amounts of STEC 2 additives extracted from (d)-(f) GIWAXS patterns of PEDOT:PSS films with no STEC, and about 45.5 wt. % of STEC 1, 2, and 8, respectively. For the PEDOT film without any STEC additives, three peaks were observed along $q_z$: $q_z$=about 0.57 Å$^{-1}$ (d=about 11.2 Å), about 1.33 Å$^{-1}$ (d=about 4.9 Å), and about 1.87 Å$^{-1}$ (d=about 3.4 Å), which can be indexed as PEDOT (200), PSS amorphous scattering, and PEDOT (010), respectively. (h)-(k) AFM phase images of PEDOT:PSS (h) compared to PEDOT with high stretchability by incorporating STEC 1 (i), 2 (j), and 3 (k).
Figure 10:
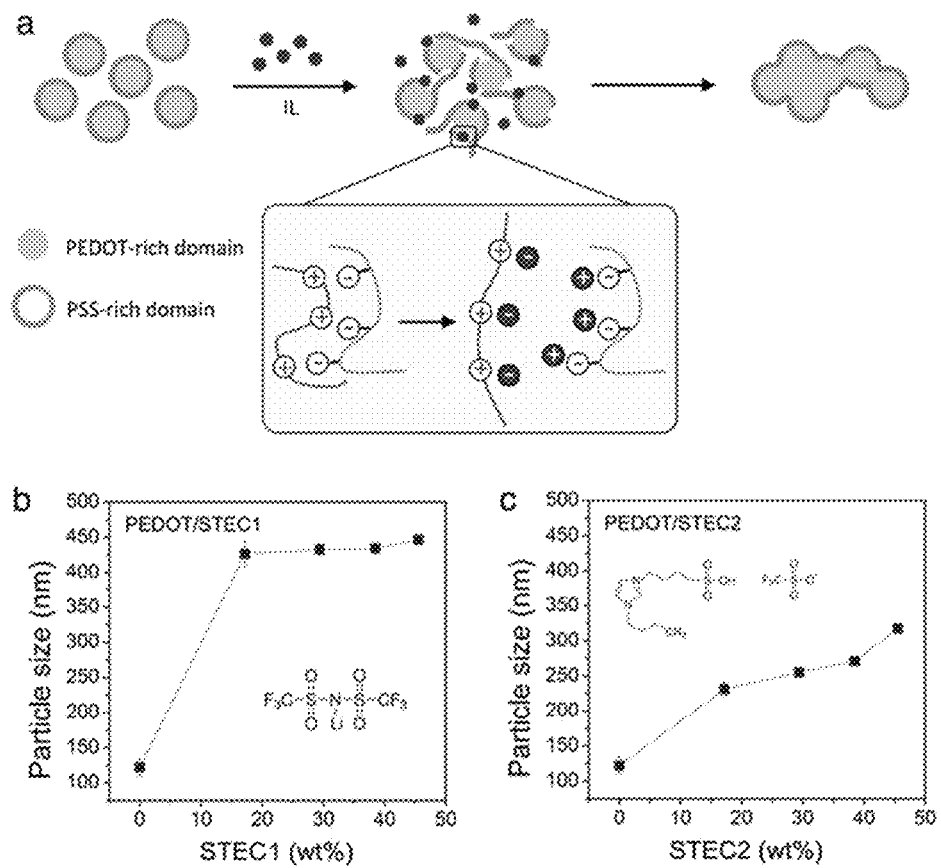
FIG. 10: (a) Schematic representation illustrating the effect of STEC on enhancing the phase separation of the PEDOT-rich and PSS-rich domains. (b) and (c) show the average particle sizes in PEDOT:PSS aqueous dispersions with different additive concentrations.

First, small ionic species can have a charge screening effect that weakens the Coulombic interactions between the polyelectrolytes, PEDOT and PSS. The charge screening effect can result in higher crystallinity of the PEDOT-rich domains. Indeed, larger colloidal particle sizes are observed in solution with addition of STEC by dynamic light scattering analysis (FIG. 10b, c). Additionally, more distinct nanofibrous structures were seen in dried films by AFM (FIGS. 5h-k and 11). In thin films, it is observed that $C_\alpha=C_\beta$ vibration peaks (about 1445 cm$^{-1}$) in Raman spectroscopy red shifted and were narrower in width in the PEDOT/STEC films compared to the pure PEDOT:PSS control (FIG. 5a). This indicates that a higher proportion of the benzoid moieties in PEDOT are converted to the quinoid structure from oxidative charge transfer doping, which results in a more planar backbone. This planarity may contribute to more efficient charge delocalization and a higher packing order. The charge delocalization effect is further confirmed by UV-vis-NIR spectra (FIG. 5b) as the about 800 nm peak became less well-defined and a more intense free-carrier tail that extending into the near infrared (NIR) was observed when STECs 1-3 were incorporated into PEDOT:PSS.

Grazing-incidence wide-angle X-ray scattering (GI-WAXS) patterns indicate the ordering in the semi-crystalline PEDOT:PSS films was improved with the addition of STECs (FIG. 5c-g, FIG. 12). Specifically, the (200) d-spacing increases with increased STEC contents in the films, which is accompanied by a slight decrease in d-spacing for the (010) peak (from about 3.4 Å to about 3.3 Å). Meanwhile, with the addition of STECs, a new peak emerges at $q_z$=about 0.89 Å$^{-1}$ (d=about 6.8 Å), which is assigned to PEDOT. In addition, this peak is observed in the PEDOT:PF$_6$ system without PSS (FIG. 13), further confirming it arises from PEDOT scattering.

Combining the above results, a schematic representation of the composition and morphology of the PEDOT/STEC films is proposed (FIG. 1d): the charge screening effect of STECs results in a morphological change to form more crystalline and more interconnected PEDOT nanofibrillar structures. Since the PEDOT phase becomes more crystalline with the addition of STEC, it is likely the STEC molecules mostly reside in the more disordered regions, which further softens the material. This gives rise to a nanofiber network embedded in a soft matrix, which is a desirable morphology for high stretchability. Such a morphology is also advantageous for high conductivity due to the higher crystallinity of the PEDOT domains as well as the improved connectivity.

Figure 6:
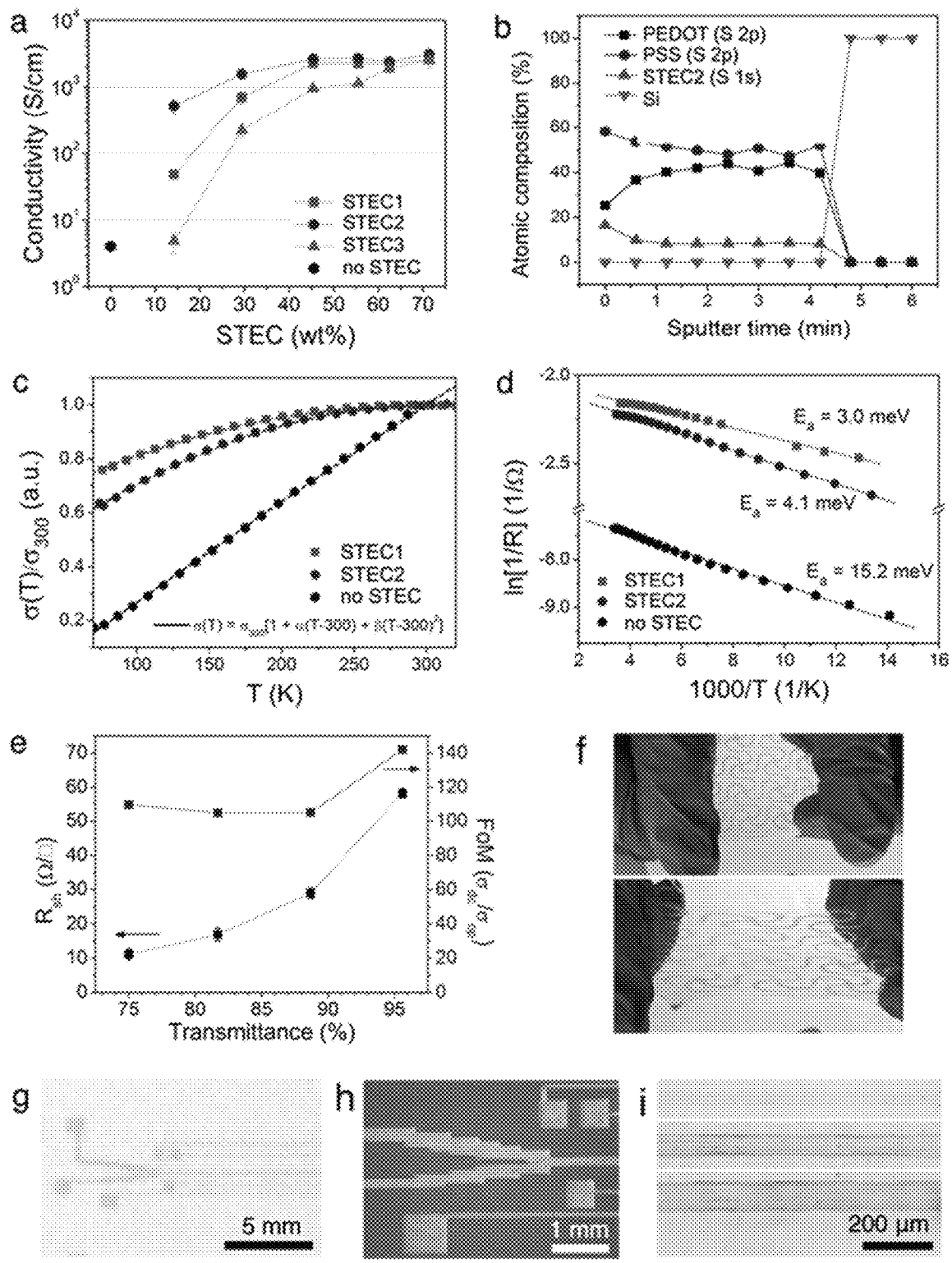
FIG. 6: Electrical properties and patterning of the stretchable PEDOT/STEC (STEC content is about 45.5 wt. %). (a) Conductivity of the PEDOT films via spin coating followed by various STEC aqueous solution treatment. (b) XPS $C_{60}$ ion gun sputtering depth profile of a stretchable PEDOT/STEC film. (c) Temperature dependence of the conductivity and (d) Arrhenius fitting for PEDOT without STEC compared to those with STEC additives. (e) Sheet resistance of the PEDOT/STEC 1 films in relation to their transparency. Transmittance values are extracted at about 550 nm. (f) A patterned PEDOT/STEC film on SEBS (top panel) and the film being stretched (bottom panel). The line width is about 1 mm. (g) Photograph and (h) optical microscope image showing micrometer-scale patterns produced by inkjet printing the PEDOT/STEC; whereas (i) illustrates the control of feature size, with line width as small as about 40 µm printed on SEBS substrate.
Figure 16:
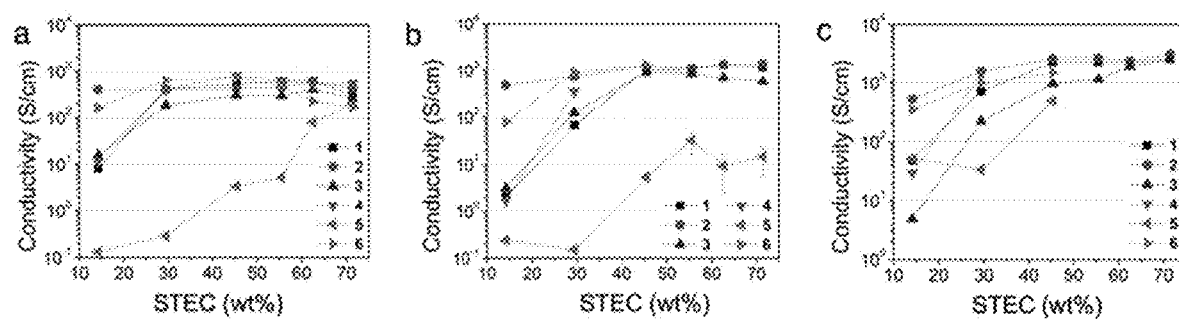
FIG. 16: Conductivity of PEDOT/STEC films in relation to the ionic liquid additive contents prepared by (a) drop casting (thick films of about 20-200 µm), (b) spin coating (thin films of about 50-200 nm), and (c) spin coating then further treated with the corresponding STEC aqueous solution.
Figure 17:
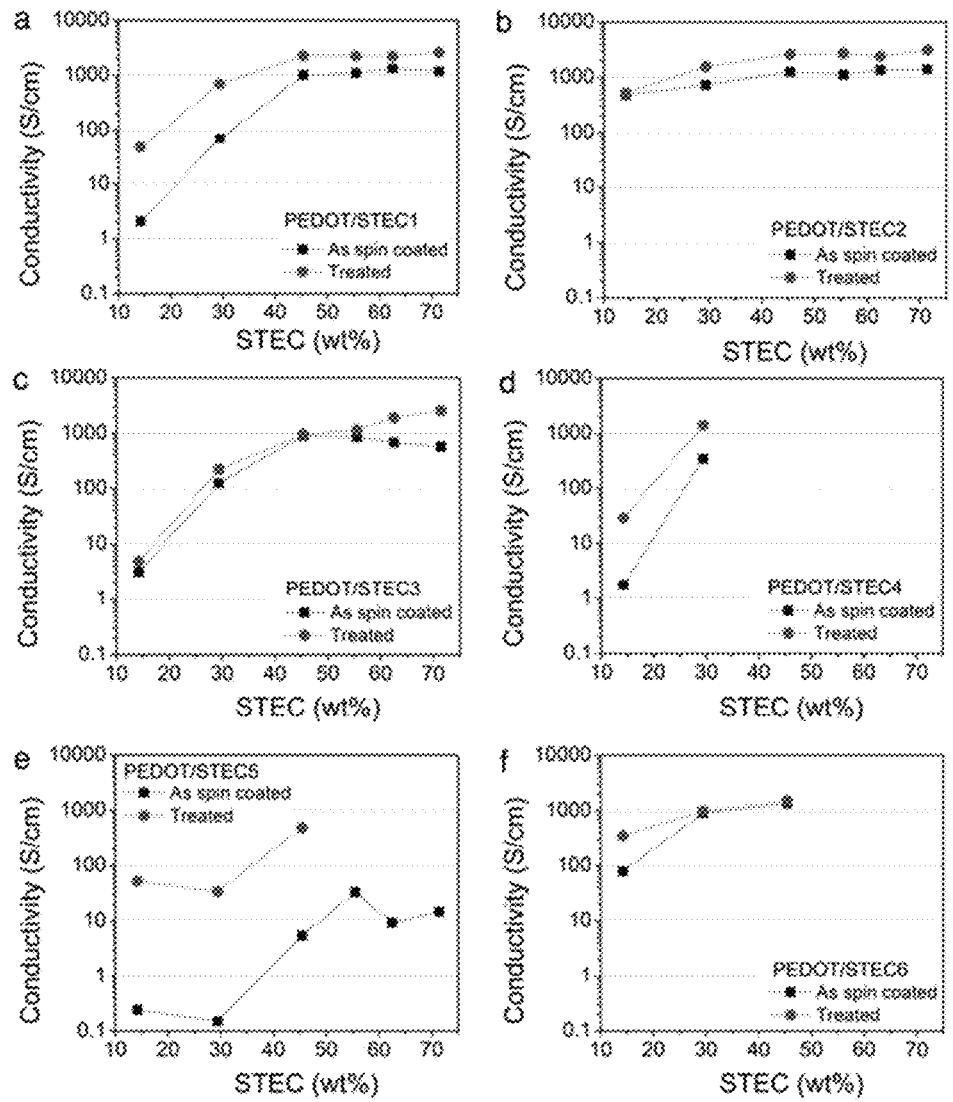
FIG. 17: Conductivity of PEDOT/STEC films with various STEC wt. % before and after further STEC solution treatment; (a)-(f) represents PEDOT with STECs 1-6, respectively. For PEDOT with STEC 4 (d) and 6 (f), the dispersion quickly gels on mixing with higher STEC content, which results in highly inhomogeneous, non-continuous films. Therefore, the conductivity values were not measured. For PEDOT films with high STEC 5 content, the films are partially delaminated after the soaking stage, rendering conductivity measurement difficult; hence values not shown.
Figure 18:
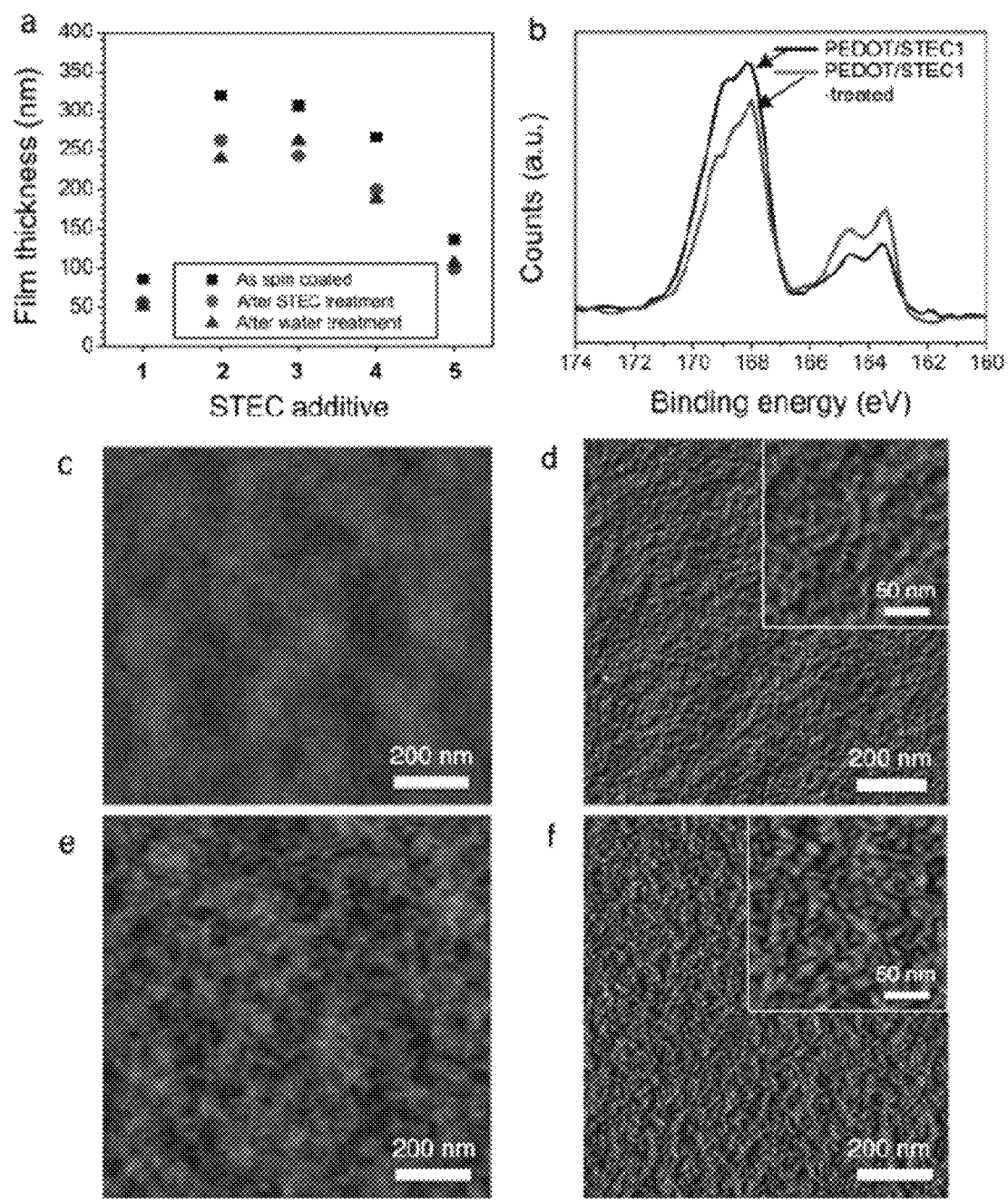
FIG. 18: Effect of further doping using STEC solution on spin coated films. (a) Change in film thickness (STEC content=about 45.5 wt. %); (b) XPS spectra comparing the change in chemical composition; (c) height and (d) phase AFM images of a PEDOT/STEC 1 film obtained by spin coating; (e) height and (f) phase AFM images of the same film after further doping with STEC solution.

Films with the highest conductivity values were obtained with the above morphological improvement and an additional STEC washing of the films (Experimental and Supplemental Information). XPS sputtering experiments indicate that the surface of the as-spun PEDOT/STEC film has a higher PSS+STEC-to-PEDOT ratio than the interior of the film (FIGS. 6b and 18). Rinsing with an STEC aqueous solution after annealing removes the excess PSS from the film surface, leading to a thinner film with a higher PEDOT content, hence further improving the conductivity (FIGS. 17-18). Treating the films with water led to a similar effect in terms of conductivity enhancement, but STEC solutions are used here to reduce the loss of STEC plasticizers that are desired for stretchability. The conductivity for PEDOT/STEC systems increased rapidly as the STEC concentration increased until about 45 wt. % (FIGS. 6a, 16-17). It then remained nearly constant upon further addition. The highest conductivity values achieved were about 2588, about 3102, and about 2544 S/cm at about 71 wt. % STEC 1, 2, 3, respectively, vs. about 4 S/cm without these additives.

Temperature Dependence of Conductivity

The chemical composition and morphology of materials can have an impact on the temperature dependence of the electrical conductivity, which provides insights on transport properties. Aiming at applications where highly stretchable materials are used as interconnects between different electronic components, possible temperature drifts should be reduced. The temperature dependence of PEDOT thin films between about 340 K to about 75 K were measured in a cryostat using a four-probe dc current method (FIG. 6c). All samples exhibited reversible temperature dependence with low hysteresis, indicating high stability. An empirical relation has been employed to extract the temperature resistance coefficients of first and second order (Supplementary section 6). While PEDOT with DMSO as the additive exhibited a very high linear temperature resistance coefficient of about $\alpha$=about 0.35%/K, PEDOT/STEC 1 and 2 showed much lower values of about $3.8 \times 10^{-7}$ and about $7.6 \times 10^{-3}$%/K, respectively.

A model to describe the temperature behavior of disordered polymeric systems assumes the charge transport is dominated by inter-chain hopping probability. The temperature dependence of such materials follows a non-Arrhenius quadratic expression originating from a Gaussian disorder and can be used to describe systems with low charge carrier densities well. On the other hand, at high charge carrier densities, an universal Arrhenius-like temperature dependence has been observed for disordered conjugated polymers. The stretchable PEDOT/STEC materials exhibited a clear temperature-activated behavior following the Arrhenius law (FIG. 6d). The activation energy extracted for PEDOT/STEC 1 and 2 were found to be just about 3 meV and about 4.1 meV, respectively. These values are much lower compared to typical PEDOT films, which have an activation energy of about 15.2 meV. Such results are in agreement with the stronger free-carrier tails observed in UV-vis-NIR spectra (FIG. 5b) that indicate that STEC enhancers also act as "secondary" dopants for PEDOT. The doping effect increases the charge carrier density and shifts the Fermi level $E_f$ above the equilibrium level $E_q$, which is represented by the maximum of the density of occupied states. The lowest activation energy of PEDOT/STEC 1 stays in good agreement with the highest room temperature conductivity and the lowest linear temperature resistance coefficient of about $3.8 \times 10^{-7}$%/K.

Applications and Patterning of Stretchable PEDOT

Since the conductivity of the stretchable PEDOT remains well above about 1000 S/cm even under about 100% strain, a thin layer can be used to achieve low resistance, rendering it a good transparent stretchable conductor. FIG. 6e depicts the relationship between film transmittance and sheet resistance. A sheet resistance of about 59 $\Omega$/sq was obtained for a film with about 96% transmittance (with substrate absorbance subtracted). This is among the highest values reported for PEDOT transparent electrodes. The resistance decreased as the film thickness is increased, and reached about 10 $\Omega$/sq with about 75% film transmittance at about 550 nm. The film with about 96% transmittance has a figure of merit (FoM) of about 142, which surpasses the previous highest value from spin-casted PEDOT films and transparent CNT electrodes.

Larger patterns (e.g., >about 500 µm) (FIG. 6f) can be readily obtained by screen printing or etching through a shadow mask, and are stretchable when printed on an elastic substrate such as SEBS. Complex patterns with resolution down to about 40 µm can be obtained through inkjet printing (FIG. 6g-i).

To demonstrate the application of stretchable PEDOT as interconnects, it is used to connect rigid LEDs (FIG. 7a). Negligible change in LED light intensity was observed even under high strain conditions such as twisting while stretching or poking the interconnect with a sharp object (FIG. 7b, c) due to the small change in resistance upon tensile strain.

One distinct advantage of an intrinsically stretchable conductor as interconnects for rigid-island matrices is that it can lead to a much higher surface filling ratio (f) for active devices (islands) compared to the wavy interconnects, where a large amount of space between the rigid islands is reserved for the wavy metal ribbons. To demonstrate the potential of PEDOT/STEC as interconnects in high-density circuits, multiple rigid islands with FET devices were connected by lines of PEDOT (FIG. 7f-h).

Figure 36:
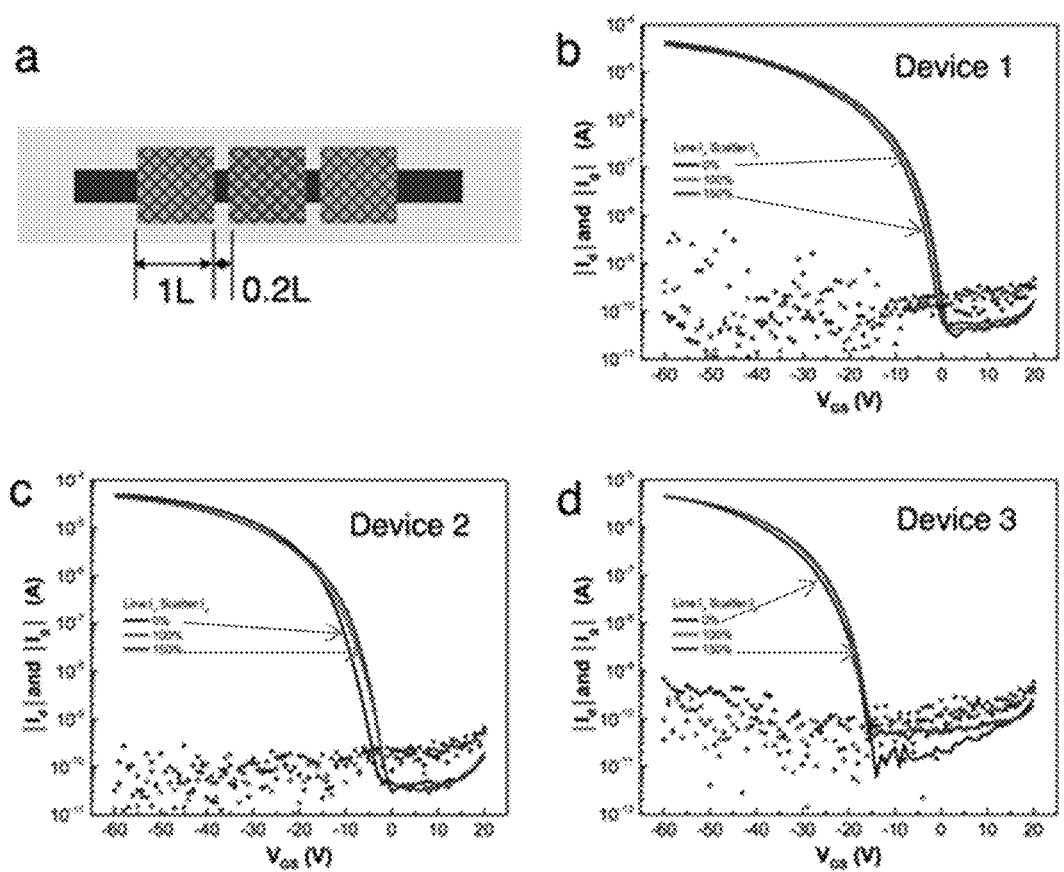
FIG. 36: (a) Top view schematic of a 3×1 array with a rigid island-to-interconnect ratio of about 5:1. (b)-(d) FET transfer characteristics for the 3 devices under 0%, about 100%, and about 150% strain.

A rigid island-to-interconnect width of about 1:1 (f=about 50%) is typically specified for wavy interconnects to reach stable performances under about 100% strain. The actual length of the stretched interconnect is much longer than the spacing between rigid islands (e.g., up to >about 12 times if straightened). In the case here, for unidirectional stretching, a rigid island-to-interconnect ratio of as high as about 5:1 (f=about 78%) can still lead to identical transistor current and threshold voltage characteristics from 0% to about 150% strain for the linear array (FIG. 36), which inflicts >about 530% strain on the PEDOT region based on finite element simulations (FIG. 7d, e).

Figure 37:
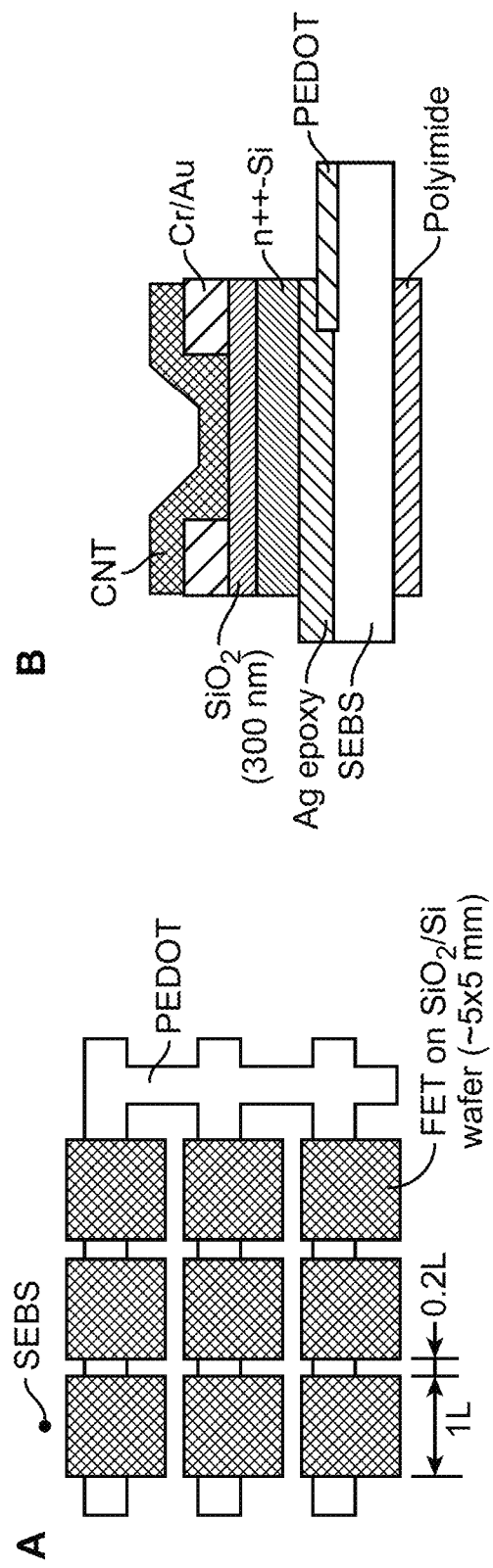
FIG. 37: (a) Top view and (b) cross-sectional view of the 3×3 rigid-island FET array on SEBS substrate. (c) Transfer characteristics of the FETs under 0% and about 125% areal strain under multi-directional stretch.
Figure 37:
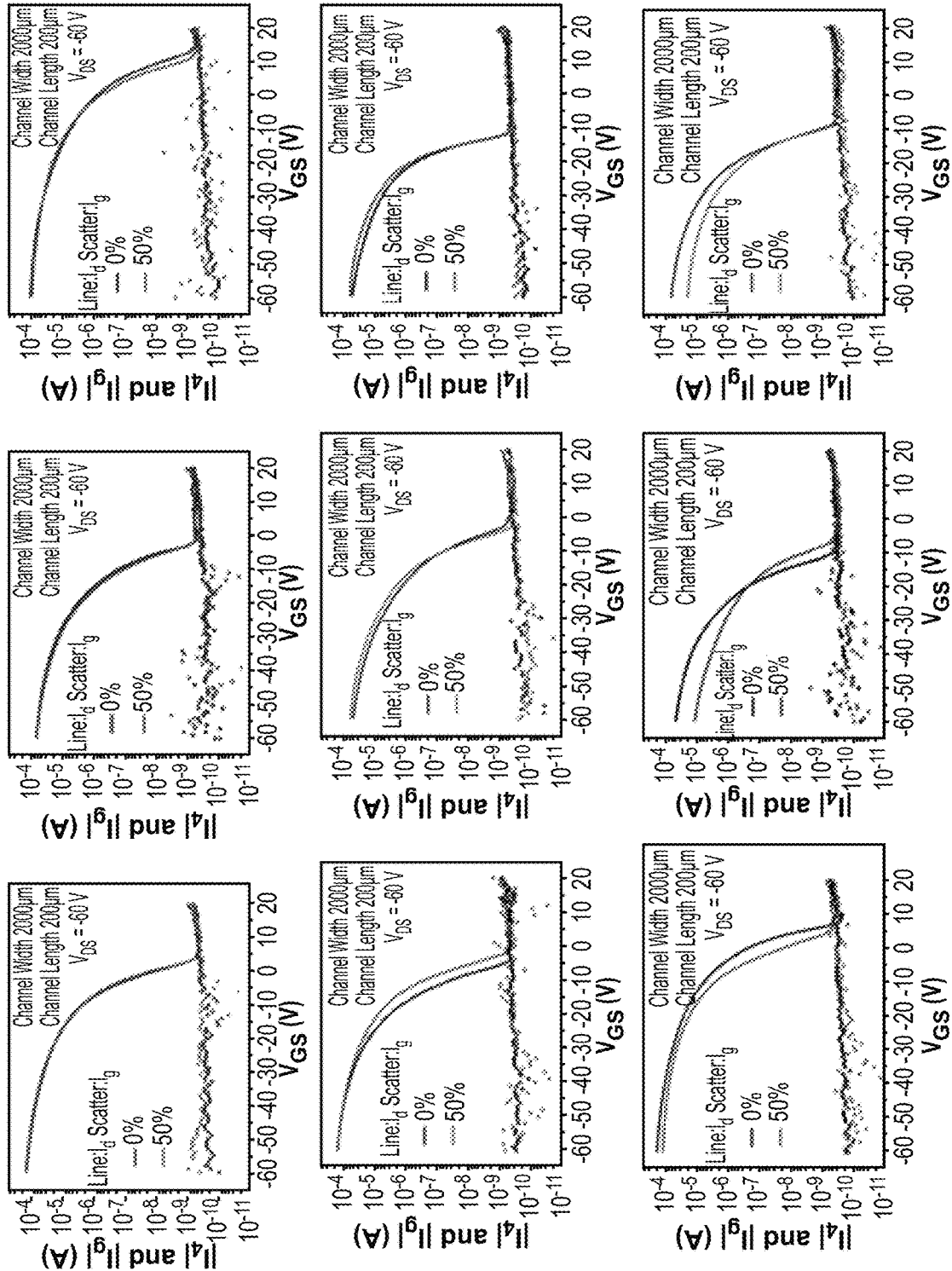
Figure 38:
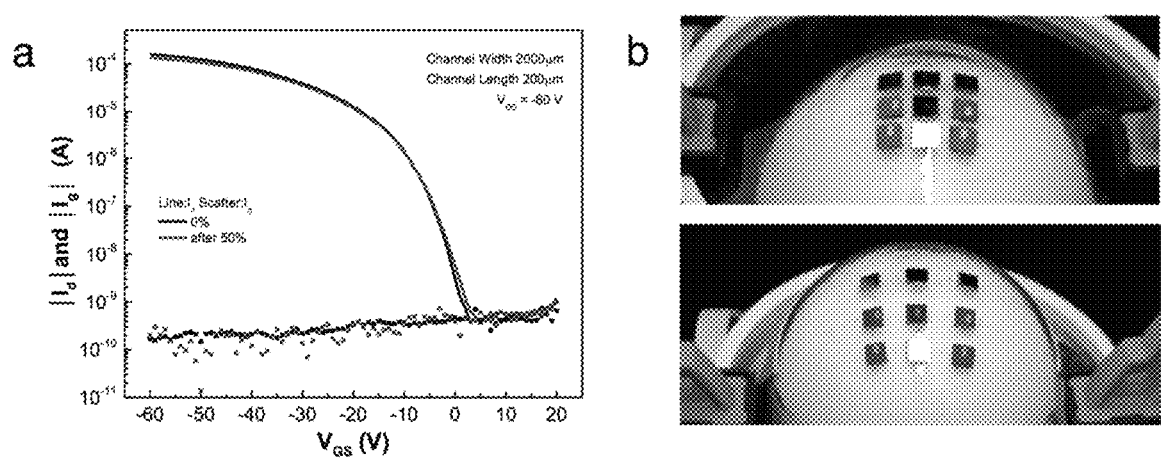
FIG. 38: (a) Representative transfer characteristic for the rigid island transistor arrays stretched on a curved object. (b) Photographs showing the array at 0% (top) and about 125% (bottom) strain.

To demonstrate the feasibility of multi-dimensional stretching, 3×3 arrays with f of about 78% were fabricated and uniformly stretched in all directions. FIG. 37 and Table 2 show the transfer curves for the nine transistors under 0% and about 125% strains for overall device structure. The mobility variation for all the transistors is within ±10% (FIG. 7i). This strain is well beyond the about 100% strain specification for wearable and epidermal electronics, illustrating the excellent stretchability and the stable electrical performances of the PEDOT interconnects under strain. Such array is especially suitable for stable performance on curved objects (FIGS. 7h, 38).

Discussion

This example has demonstrated a highly stretchable and conductive PEDOT polymer, by incorporating ionic liquid assisted stretchability and electrical conductivity (STEC) enhancers to result in a morphology that is beneficial for both high stretchability and conductivity while a further boost in conductivity is achieved through a proper selection of anions. The resulting materials show record-high stretchability and conductivity, which is rare to coexist for conducting polymers. High-density FET arrays connected using the stretchable PEDOT films show stable performance under >about 100% strain. This material synergistically combines high electrical conductivity, exceptional mechanical ductility and patternability by printing, hence opening many new avenues towards next-generation wearable and epidermal electronics and bioelectronics.

Materials and Methods

Material Preparation

PEDOT:PSS (PH1000) was obtained from Clevios and the ionic liquids from Sigma-Aldrich and Santa Cruz Biotechnology, Inc. Hydrogenated styrene butadiene block copolymer (SEBS) with about 20% styrene content (Tuftec™ H1052) was supplied by AK Elastomer. HiPCO SWCNT was sorted via a previously reported method using poly(3-dodecylthiophene-2,5-diyl) (P3DDT) to obtain semiconducting SWCNT for transistor fabrication.

In a typical experiment, STEC of about 10-71 wt. % was added to the PEDOT:PSS aqueous dispersion (about 1.1-1.3 wt. %) and stirred vigorously for about 15 min. Thick films were acquired by drying the mixture overnight in a Teflon mold, then annealing at about 130° C. for about 15 min. Thin films were processed onto glass, $SiO_2$/Si or SEBS substrates by spin coating at about 1000 rpm for about 1 min under ambient conditions followed by about 10-min annealing at about 130° C. A post-deposition washing stage was then carried out by dropping an aqueous solution containing about 10 mg/mL of the corresponding STEC on the PEDOT films, waiting for about 1 min, and removing the liquid by spinning the samples at about 3000 rpm for about 1 min. Glass or $SiO_2$/Si were treated with oxygen plasma at about 150 W for about 30 s and SEBS with UV ozone for about 30 min or oxygen plasma for about 10 s (about 150 W) prior to PEDOT deposition via spin coating (about 1000 rpm for about 1 min; anneal at about 70° C. for about 30 min). The SEBS substrates were prepared from an about 200 mg/mL toluene solution casted onto a glass slide.

Electrical Property

Conductivity measurements were carried out using a four-point geometry.

Electrodes were deposited by either applying silver paste, eutectic gallium-indium (EGaIn), or evaporating gold. A minimum of 3-5 measurements were obtained for an average value. Low temperature dependent measurements were performed in a LakeShore Cryostat under about $10^{-5}$ mbarr vacuum. A bottom gold contact geometry was used to ensure stable electrical contacts under thermal cycling. A slow cooling and heating rate of about 1.4 K/min assured the stabilization at each temperature.

Mixed Ion-Electron Conductivity

Mixed ion-electron conductivity was evaluated using impedance measurements. The PEDOT films with STEC enhancers were cut into round tablets with about 3.5 mm in diameter and about 100 μm in thickness. Two glassy carbon electrodes with about 3 mm in diameter were used to sandwich the tablet to form an electrical contact for the impedance measurement. The impedance data as functions of frequency were acquired by a Bio-Logic VSP-300 workstation with the sine wave signal amplitude of about 10 mV. Resistances from the ionic vs. electronic components were calculated using previously reported procedures.

Mechanical Property

Mechanical properties of freestanding films of about 200 μm in thickness were studied using Instron 5565 with about 100 N loading cell using a dumbbell film geometry. The storage, loss moduli and stress relaxation tests were carried out on a dynamic mechanical analysis (DMA) (TA Instrument Q800).

Morphological and Chemical Characterization

Microscopy was performed on a FEI XL30 Sirion SEM. AFM images were recorded in tapping mode using a Veeco Multimode AFM. UV-vis-NIR spectra were collected on an Agilent Cary 6000i model. DLS experiments were carried out using 100-fold diluted PEDOT/STEC dispersions on a Brookhaven Instrument 90. XPS was performed on a PHI Versaprobe Scanning XPS Microprobe. Sputtering was carried out at about 10 kV and about 20 mA with a $C_{60}$ ion sputtering gun to preserve the chemical information in the polymer films. Film thickness values were measured using a contact probe Dektak 150 profilometer and averaged from a minimum of three areas.

Grazing-Incidence X-Ray Scattering

Grazing-incidence wide-angle X-ray scattering (GIWAXS) measurements were carried out at the Stanford Synchrotron Radiation Lightsource (SSRL) at beamline 11-3 with a photon energy of about 12.735 KeV and sample-to-detector distance of about 320 mm. The incident angle was fixed at about 0.14 degrees to probe the entire film with reduced substrate scattering.

Patterning

Patterned films with feature size >about 500 μm (such as for the LED or FET arrays) were obtained by first repeating the spin coating and washing steps 3 times for PEDOT on SEBS, followed by oxygen plasma etching (about 150 W, about 5-10 min) through a shadow mask until the exposed PEDOT films were completed removed.

Micrometer-sized patterns of the stretchable PEDOT/STEC were achieved by inkjet-printable using a 4-times diluted dispersion. The dispersion was passed through a glass fiber syringe filter of about 0.7 μm pore size and degassed for a few minutes to remove trapped air bubbles before loading into a cartridge. A Dimatix Fujifilm DMP2800™ inkjet printer with about 10 pL drop volume cartridges was used to print this ink on different substrates, such as $SiO_2$/Si, SEBS or photo-paper. The optimal printing parameters for plasma-treated SEBS substrate (about 150 W, about 10 s) were the following: drop-to-drop spacing of about 30 μm; jet speed and frequency of about 5 m s$^{-1}$ and about 1.5 kHz, respectively; cartridge temperature of about 28° C. and substrate temperature of about 30° C.

Stretchable Rigid-Island Transistor Arrays

Transistors on rigid Si islands in arrays were fabricated by first patterning Cr/Au (about 5/40 nm) source and drain electrodes through a shadow mask on a $SiO_2$/n$^{++}$-Si wafer (Si serves as back gate and $SiO_2$ as the dielectric layer). Each FET device has a channel width of about 1000 μm and a channel length of about 200 μm. The sorted SWCNTs dispersion (about 0.7 mL) was spin coated on the patterned substrates (about 2 in×about 2 in) at about 2000 rpm for about 90 s. The sample was then soaked in toluene at about 90° C. for about 30 minutes to remove the P3DDT, dried with nitrogen flow, and annealed at about 120° C. for about 20 minutes under ambient conditions. PDMS shadow masks were aligned on the devices to protect the active device areas. The SWCNTs between devices were then etched away by oxygen plasma (about 150 W, about 10 min). Single rigid-island devices were obtained by dividing the whole piece into about 5 cm×about 5 cm chips along the CNT-free spaces. The 3×3 stretchable organic transistor active matrices were fabricated by immobilizing the individual islands using silver epoxy onto a SEBS substrate, and linked together using patterned PEDOT/STEC 1, creating a common back gate (FIG. 7f). The transistor performance was characterized using a Keithley 4200 SC semiconductor analyzer in ambient conditions under different strains for each rigid island while applying common gate voltages through the PEDOT interconnects.

Finite Element Simulation

Finite element analysis for simulating the strain distributions in the FET arrays was carried out using the software ABAQUS.

Supplementary Information

Selection of Stretchability and Electrical Conductivity (STEC) Enhancers

It is found that a variety of small molecule ionic additives can serve as effective STECs for PEDOT:PSS for inducing both high stretchability and high conductivity. Their ionic nature allowed them to simultaneously tune morphology and dope the polymer, while also promoting effective phase separation between PEDOT and PSS and enhancing the crystallinity of the PEDOT-rich domains (mechanism and selection guideline discussed above and further below). FIG. 8 summarizes particular bulk material characteristics: conductivity, maximum tensile strain, and Young's modulus, for free-standing films that are about 200 μm thick. The additives that lead to conductivity over about 100 S/cm and a maximum tensile strain above about 100%, STECs 1-3, are selected for further investigation. The names and structures of the additives are shown in Table 1.

The conductivity values for these thick drop-casted films are lower than those of the thin spin-coated films presented in FIGS. 6a and 16-17. This is a general phenomenon that has been observed for PEDOT:PSS films. This difference is attributed to morphology difference due to processing methods and drying kinetics. Additionally, in this example, the spin-coated films were further rinsed with STEC solution while the drop-casted films were not further treated. Note that the free-standing films were used for mechanical property testing, and their conductivities measured to serve as a guide to identify suitable STEC additives (Table 1 and FIG. 8). STECs 1, 2, 3 were identified as the highest performing STEC, and their electrical properties were further evaluated in detail (FIGS. 6a and 16-17).

TABLE 1

Summary of STEC Structures and Their Effects on the Electrical and Mechanical Properties of Freestanding PEDOT:PSS Films (Thickness Range: about 150-200 μm) with about 45.5 wt. % of STEC. The films were prepared by drop casting.

| # | STEC Structure | Chemical name | Freestanding PEDOT:PSS film with STEC additive | | |
|---|---|---|---|---|---|
| | | | Conductivity (S/cm) | Maximum tensile strain (%) | Young's modulus (MPa) |
| 1 | [structure] | Bis(trifluoromethane) sulfonimide lithium salt | 608 | 133 | 55 |
| 2 | [structure] | 4-(3-Butyl-1-imidazolio)-1-butanesulfonic acid triflate | 420 | 112 | 28 |
| 3 | [structure] | 1-Butyl-3-methylimidazolium octyl sulfate | 288 | 176 | 47 |
| 4 | [structure] | Zinc di[bis(trifluoromethyl sulfonyl)imide] | 805 | 58 | 176 |

TABLE 1-continued

Summary of STEC Structures and Their Effects on the Electrical and Mechanical Properties of Freestanding PEDOT:PSS Films
(Thickness Range: about 150-200 μm) with about 45.5 wt. % of STEC. The films were prepared by drop casting.

| | | | Freestanding PEDOT:PSS film with STEC additive | | |
|---|---|---|---|---|---|
| # | STEC Structure | Chemical name | Conductivity (S/cm) | Maximum tensile strain (%) | Young's modulus (MPa) |
| 5 | | 4-(3-Butyl-1-imidazolio)-1-butanesulfonate | 3.4 | 136 | 34 |
| 6 | | 1-Ethyl-3-methylimidazolium bis(trifluoromethylsulfonyl)imide | 720 | 71 | 141 |
| 7 | | Methyl-trioctylammonium bis(trifluoromethylsulfonyl)imide | 292 | 22 | 706 |
| 8 | | Trihexyltetradecyl phosphonium bis(2,4,4-trimethylpentyl)phosphinate | 0.3 | 16 | 1365 |
| 9 | | 1-Butyl-3-methylpyridinium bis(trifluoromethylsulfonyl)imide | 21 | 5 | 636 |
| 10 | | Dioctyl sulfosuccinate sodium salt | 42 | 41 | 178 |
| 11 | | Sodium dodecylbenzenesulfonate | 128 | 54 | 277 |

TABLE 1-continued

Summary of STEC Structures and Their Effects on the Electrical and Mechanical Properties of Freestanding PEDOT:PSS Films (Thickness Range: about 150-200 μm) with about 45.5 wt. % of STEC. The films were prepared by drop casting.

| # | STEC Structure | Chemical name | Freestanding PEDOT:PSS film with STEC additive | | |
|---|---|---|---|---|---|
| | | | Conductivity (S/cm) | Maximum tensile strain (%) | Young's modulus (MPa) |
| 12 |  | Dodecylbenzenesulfonic acid | 542 | 56 | 151 |

Mechanical Characterization of Bulk Freestanding Films

To elucidate the mechanical properties of the stretchable PEDOT, the stress/strain behavior of the free-standing films with various STEC additives are compared to the control sample without STEC but with DMSO, a polar additive used for enhancing PEDOT:PSS conductivity, was evaluated (FIG. 1f). The control film ruptures when about 18% strain was applied, indicating poor stretchability. On the other hand, the PEDOT films with STEC additives 1, 2, 3 have greatly enhanced maximum tensile strain of about 133%, about 112%, and about 176%, respectively (FIG. 1f). This enhancement in stretchability is attributed to a combination of the fibrous morphology (FIG. 5h-k) and the plasticizing effect of STEC molecules in the disordered domains in PEDOT:PSS. The most stretchable films mostly possess fibrous morphology (FIGS. 5h-k and 11), which could be a significant contributing factor for achieving high stretchability.

Figure 14:
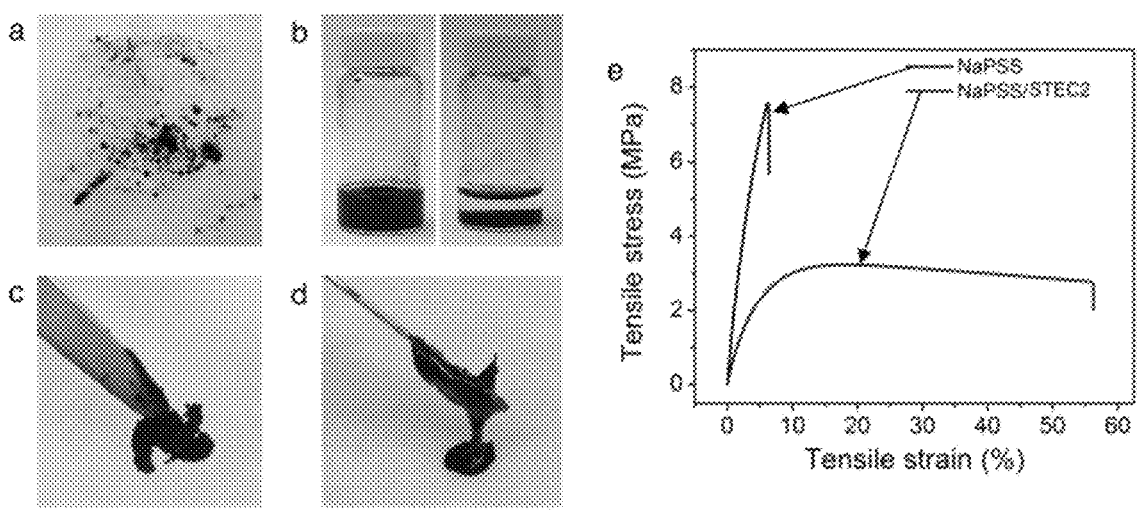
FIG. 14: (a) Picture of insoluble PEDOT:$PF_6$ powder. After sonicating the powder in water for about 1 h, an apparently homogeneous dispersion is formed (b, left). However, the particles precipitate out within minutes (b, right), illustrating its insoluble, non-dispersible nature. STEC 2 was added to this powder and thoroughly mixed using a mortar and pestle. Picture in (c) shows the paste that was formed after dispersing this PEDOT with about 45.5 wt. % STEC 2, and (d) shows the gel-like substance with about 62.5 wt. % STEC 2 addition. These results illustrate that the STEC can effectively disperse the insoluble PEDOT and have a plasticizing effect. Similarly, about 45.5 wt. % of STEC 2 was added to polystyrenesulfonate sodium (NaPSS) with a molecular weight of about 200,000 Da. This molecular weight is chosen as it is the commercially available grade with the closest molecular weight matching to those in the PEDOT:PSS (about 400,000 Da). (e) shows the stress/strain curves of the pure NaPSS films and after the addition of STEC. A much enhanced maximum tensile strain is achieved, which illustrate that STEC has a plasticizing effect for both the PEDOT and the PSS phase.

To confirm the plasticizing effects of STEC on PEDOT: PSS, STEC 2 was separately mixed with NaPSS and insoluble PEDOT as a model system (FIG. 14). Incorporating about 45.5 and about 62.5 wt. % of STEC 2 into the insoluble, powdery PEDOT leads to a paste and gel-like substance, respectively, indicating the STEC can effectively swell PEDOT chains (FIG. 14a-d). Mechanical tests could not be carried out since the paste does not possess good film forming properties, likely due to the low molecular weight of PEDOT. On the other hand, including STEC 2 into NaPSS led to a significant increase in stretchability and a much reduced Young's modulus, illustrating the plasticizing effect of STEC for PSS (FIG. 14e). Therefore, due to the ability of STECs to serve as effective plasticizers for both PEDOT and PSS, STEC addition led to significantly enhanced maximum tensile strains and reduced Young's moduli.

Figure 9:
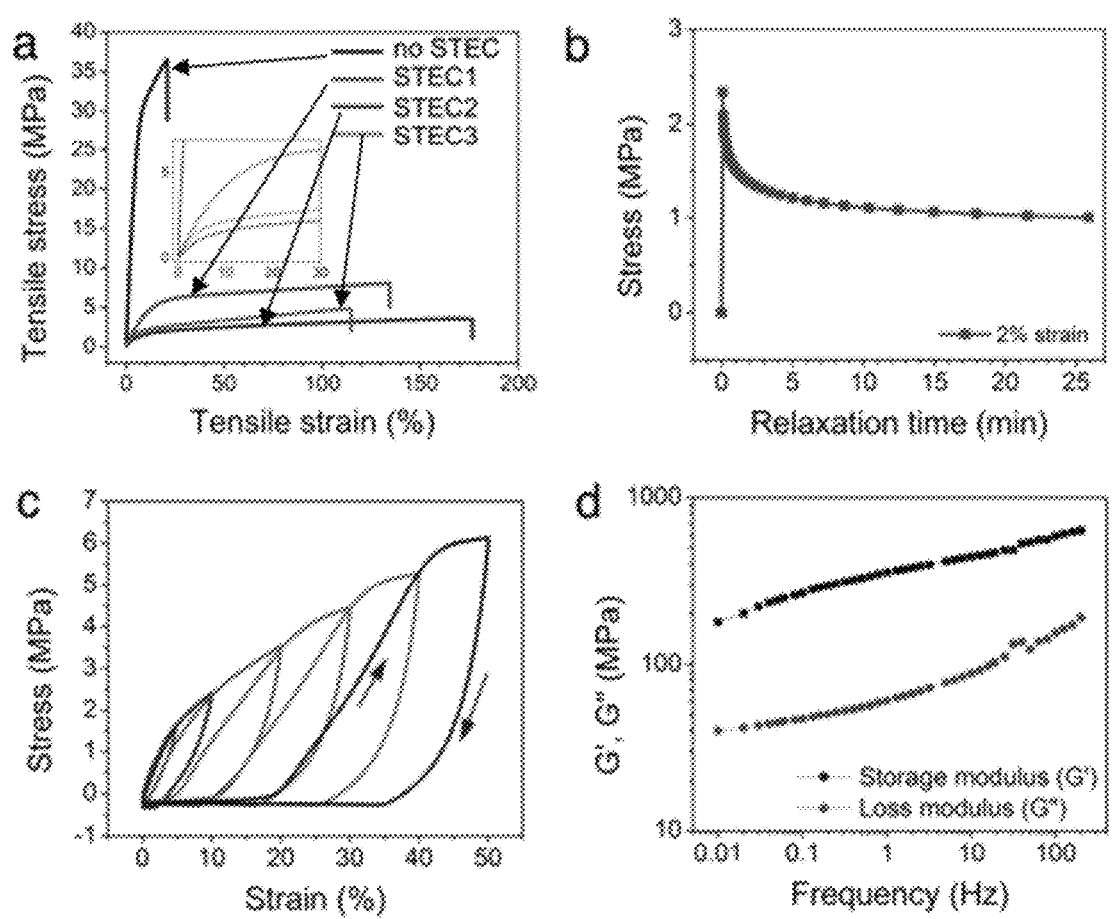
FIG. 9: (a) Stress/strain behavior of freestanding PEDOT films with various additives. Inset provides a zoomed-in view over the lower strain section where the elastic-to-plastic transition occurs. (b) Stress relaxation, (c) strain cycling (arrows indicating loading and unloading paths) and (d) storage and loss moduli of PEDOT/STEC 2 films.

To further characterize the mechanical properties of the PEDOT/STEC films, stress relaxation, strain cycling, and frequency sweep experiments were carried out (FIG. 9b-d). A relaxation time of about 72 seconds was measured (FIG. 9b). A PEDOT/STEC film is loaded and unloaded with a strain rate of about 0.1/min and the sample is reloaded to a larger strain after waiting for about 5 min between two cycles (FIG. 9c). The stress-strain curves showed hysteresis between loading and unloading. When the film was stretched beyond about 20% strain, the film length change became partially reversible, indicating the viscoplastic response of the film. In the frequency sweep experiment shown in FIG. 9d, the storage modulus is higher than the loss modulus during the entire frequency range, confirming the film is a solid rather than a fluid despite the high concentration of STEC. SEM analysis of the film cross-section also shows a densely packed, solid interior (FIG. 15a, b).

Effect of STEC on PEDOT:PSS.

The STEC additives have three effects on PEDOT:PSS: (a) inducing phase separation forming distinctive PEDOT- and PSS-rich domains; (b) enhancing the crystallinity of the PEDOT-rich domains; and (c) plasticizing the amorphous regions of PEDOT and PSS.

(a) Effect on Phase Separation and Morphology

It has been proposed that the Clevios PEDOT:PSS PH1000 dispersion used in this example has a core-shell structure. PSS is water soluble, and the sulfonate groups serve as dopants for the conductive PEDOT. The low molecular weight PEDOT (MW of about 1000-2500 Da) is insoluble in water; hence, it adheres to segments of the high molecular weight PSS chains (MW of about 400,000 Da) through Coulombic attractions. These ionic complexes form coiled, globular structures in water where the hydrophilic PSS-rich shell shields the hydrophobic PEDOT-rich core from water, forming a colloidal dispersion. However, the insulating PSS shells become a barrier for charge transport between the PEDOT-rich domains, resulting in low conductivity (<about 1 S/cm) in films.

Polar or ionic substances such as ethylene glycol or ionic liquids can induce the merging of PEDOT/PSS particles (FIG. 10a). When STEC molecules are incorporated into the PEDOT:PSS system, due to their small sizes, they can more readily interact with both the positively-charged PEDOT and the negatively-charged PSS chains. This leads to a charge screening effect that weakens the Coulombic interactions between the PEDOT and PSS chains. Therefore, larger PEDOT-rich domains can form due to the dissociation between some PEDOT and PSS, which aids in enhancing the conductivity of the films. Dynamic light scattering profiles (FIG. 10b) show that the average particle sizes of the PEDOT:PSS colloids increase significantly upon the addition of various STEC additives, confirming the mechanism depicted in FIG. 10a.

Figure 11:
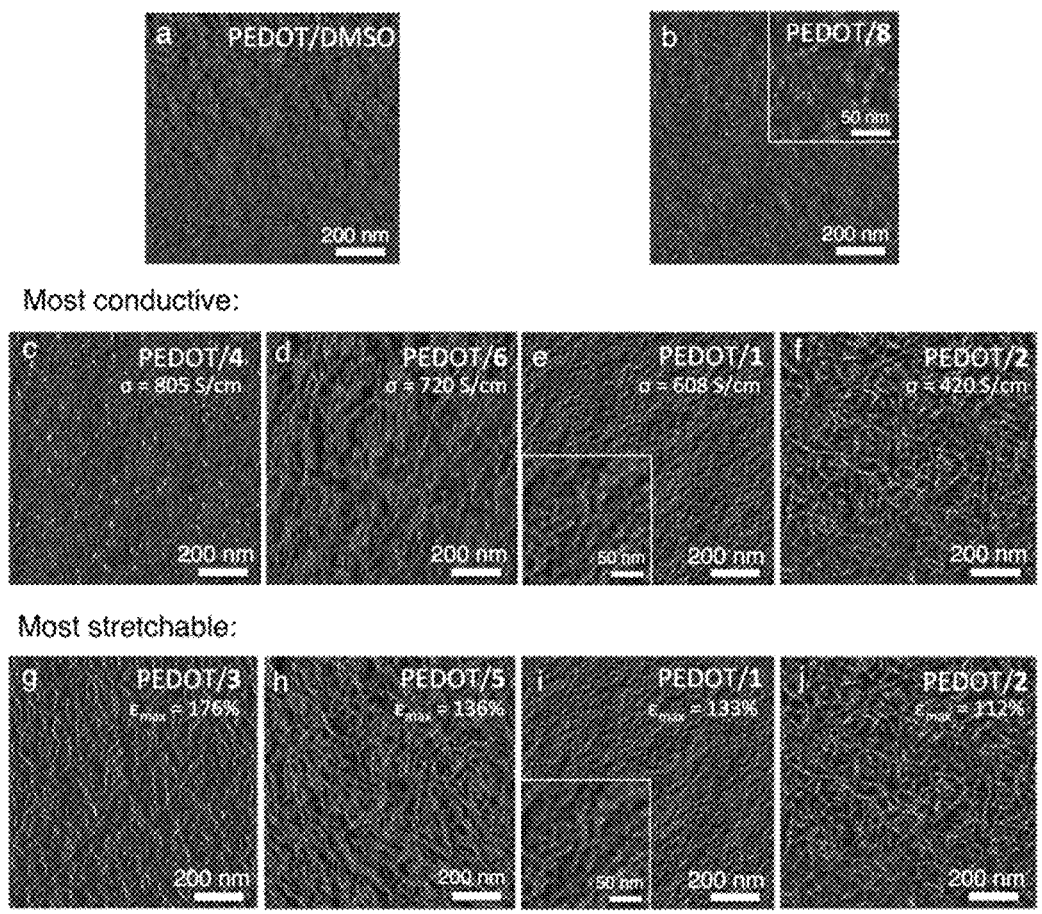
FIG. 11: AFM phase images of PEDOT with various additives: (a) shows the morphology of PEDOT without any STEC; (b) shows film with STEC 8—an additive that does not enhance stretchability or conductivity. (c)-(f) are the morphology of the films with the highest conductivity (conductivity marked on each image), and (g)-(j) show those that are the most stretchable (maximum tensile strain labeled on each image). Insets in (e) and (i) are magnified views showing the film features.
Figure 12:
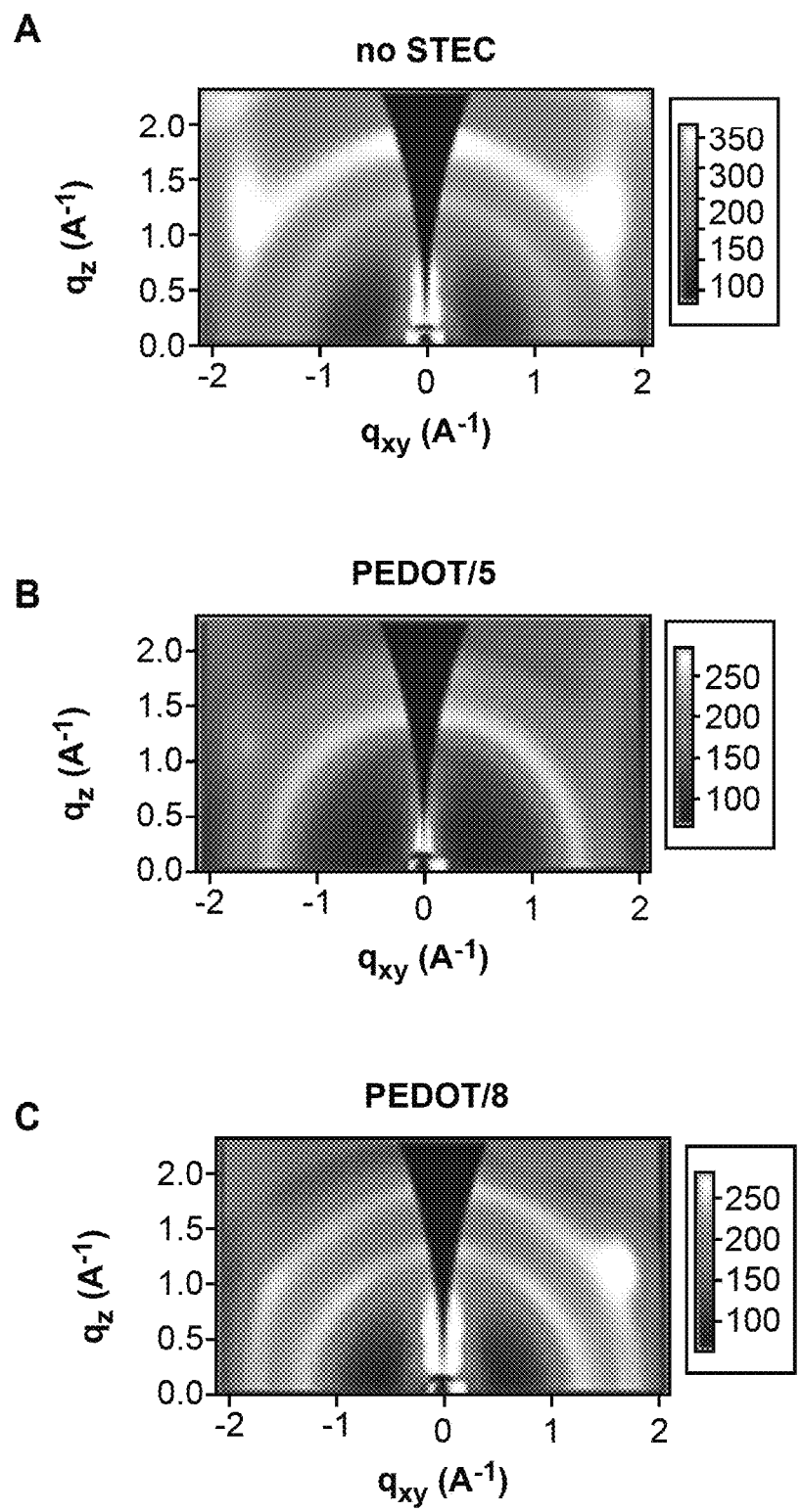
FIG. 12: GIWAXS 2D images of PEDOT films without any STEC additives (a), with additive (about 45.5 wt. %) that lead to high stretchability but poor conductivity (b), and both low stretchability and conductivity (c). GIWAXS patterns of STEC additives that result in a combination of high stretchability and conductivity are shown in (d) and (e). The percentage of STEC in PEDOT:PSS films are indicated on top of the respective 2D images. (f) and (g) are the reduced plots for the scattering images in (d) and (e), respectively, averaging the scattering intensity within a 30-degree wide sector around vertical $q_z$ direction. (h) combines the line cut plots of PEDOT:PSS films without any STEC additives and those with about 45.5 wt. % of different additives for comparison.
Figure 12:
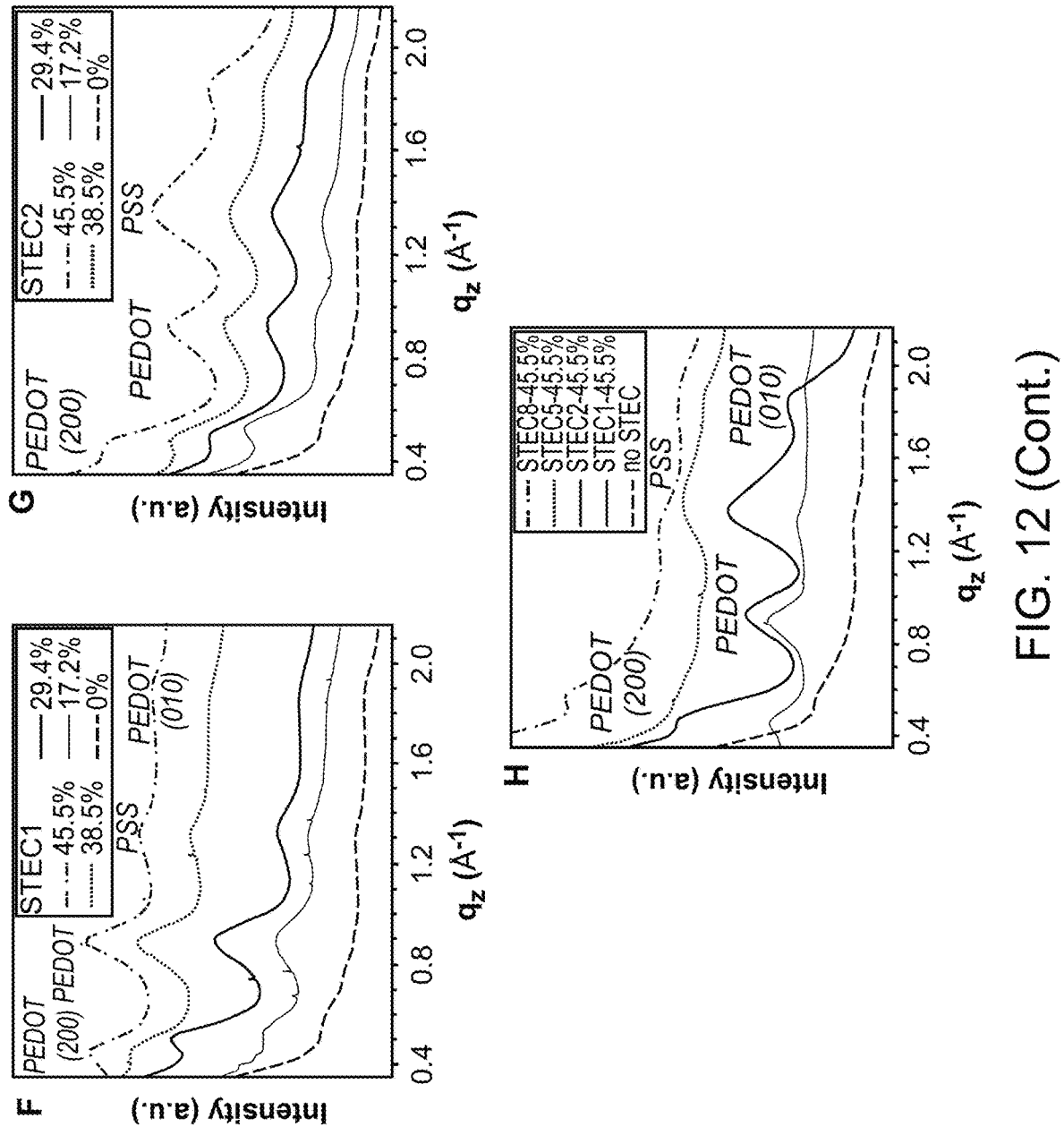

This STEC-induced charge screening effect is also reflected by the AFM images of the solid films (FIG. 11). The PEDOT:PSS film with about 5% DMSO and without STEC enhancers show a rather featureless morphology (FIG. 11a). However, clear domains of larger feature sizes are formed with the addition of any of the STEC enhancers (FIG. 11b-j). Note that the morphology of the films is not the sole factor in determining the film conductivity. FIG. 11c-f illustrates the four most conductive PEDOT/STEC systems, while FIG. 11b corresponds to a film that is poorly conductive (about 0.3 S/cm). One possible reason for the low conductivity is that the PEDOT-rich grains in PEDOT/STEC 8 do not appear to be well-connected, hence leading to a poor conduction pathway.

The STEC-induced charge screening can also have an effect on the chain conformation of polyelectrolyte complexes such as PEDOT:PSS. The weakened Coulombic interaction between PEDOT and PSS allows PEDOT to be partially dissociated from the highly coiled PSS and adopt a more planar conformation, which promotes delocalization of charge carriers that can lead to an increase in conductivity. Raman spectra of the PEDOT/STEC films show a red shift of the $C_\alpha=C_\beta$ vibration peak (about 1445 $cm^{-1}$) and narrowing of the peak compared to the PEDOT without any additives (FIG. 5a). This change indicates that a higher proportion of the resonant structure of PEDOT chains is turning from the benzoid structure in the pure PEDOT:PSS films to the more planar quinoid structure in PEDOT/STEC. In addition, compared to the PEDOT:PSS films without STECs, UV-vis-NIR spectra of the PEDOT/STEC films exhibit a more prominent free-carrier tail that extends into NIR and a less well-defined peak at about 800 nm. Such results indicate better delocalization of charges along the PEDOT backbone, another indication for a less coiled chain conformation, which leads to enhanced conductivity.

(b) Effect on the Crystalline Regions

As we noted in the previous section, not all STEC additives lead to an enhancement of conductivity despite a clearer phase separation between the PEDOT- and PSS-rich regions. This observation indicates there are other factors at play.

PEDOT:PSS is a semi-crystalline polymer, where small PEDOT-rich crystallites are distributed within a disordered matrix. Such structure is reflected by the high background scattering intensity in the GIWAXS patterns (FIG. 12a-e). GIWAXS analysis shows that the PEDOT/STEC with high conductivity, such as PEDOT/STEC 1 or 2, exhibit significantly higher crystallinity (FIG. 12d, e) despite being highly stretchable, indicating the STEC plasticizers are likely distributed in the disordered matrix. The corresponding near out-of-plane intensity plots are shown in FIGS. 12f and g. For the PEDOT film without any STEC additives, three peaks were observed along $q_z$: $q_z$=about 0.57 $Å^{-1}$ (d=about 11.2 Å), about 1.33 $Å^{-1}$ (d=about 4.9 Å), and about 1.87 $Å^{-1}$ (d=about 3.4 Å), which can be indexed as PEDOT (200), PSS amorphous scattering, and PEDOT (010), respectively. With the addition of STEC, the diffraction peak corresponding to lamella packing, (200), becomes much better defined and increase in relative intensity (FIG. 12d, e). Meanwhile with the addition of STECs, a new peak emerges at $q_z$=about 0.89 $Å^{-1}$ (d=about 6.8 Å), which is assigned to PEDOT. In addition, this peak is observed in the non-soluble PEDOT: $PF_6$ system (FIG. 13), further confirming it arises from PEDOT scattering. The more profound presence of lamella packing peaks indicates the PEDOT/STEC samples have better ordered crystalline domains than that without any STEC additive. Interestingly, the (200) d-spacing increases with increased STEC contents in the films, which is accompanied by a slight decrease in d-spacing for the (010) peak (from about 3.4 Å to about 3.3 Å). This again indicates an increase in the degree of molecular ordering and local crystallinity.

On the contrary, for the STEC additives (e.g., 5 or 8) that lead to low conductivities, the GIWAXS patterns more closely resemble the pure PEDOT:PSS films (FIG. 12b, c), without indications of better ordered PEDOT crystalline domains. AFM phase image shows that PEDOT/STEC 5 has a well-connected, fibrous structure (FIG. 11h) similar to some of the samples that are highly conductive, but its conductivity is orders of magnitude lower (about 3.4 S/cm) (Table 1 and FIG. 8). GIWAXS reveals that the PEDOT/ STEC 5 system is highly disordered, with a weak PEDOT π-π stacking (010) peak along the $q_z$ direction, and a broad PSS scattering ring. The PEDOT (200) peak that is present in pure PEDOT:PSS and PEDOT/STEC 1 or 2 films was not observable. This lack of order in the PEDOT-rich domains is likely to be responsible for the low conductivity as the inter-chain charge transport is not efficient. Furthermore, PEDOT/STEC 8, another system with low conductivity (about 0.3 S/cm), has a rather similar diffraction pattern as pure PEDOT:PSS (FIG. 12c) and doesn't exhibit the $q_z$=about 0.89 $Å^{-1}$ (d=about 6.8 Å) peak that is associated with PEDOT that has higher crystallinity and conductivity. Hence, a combination of phase separation and high crystallinity of the PEDOT-rich domains are desired for achieving high conductivity in PEDOT/STEC.

Figure 13:
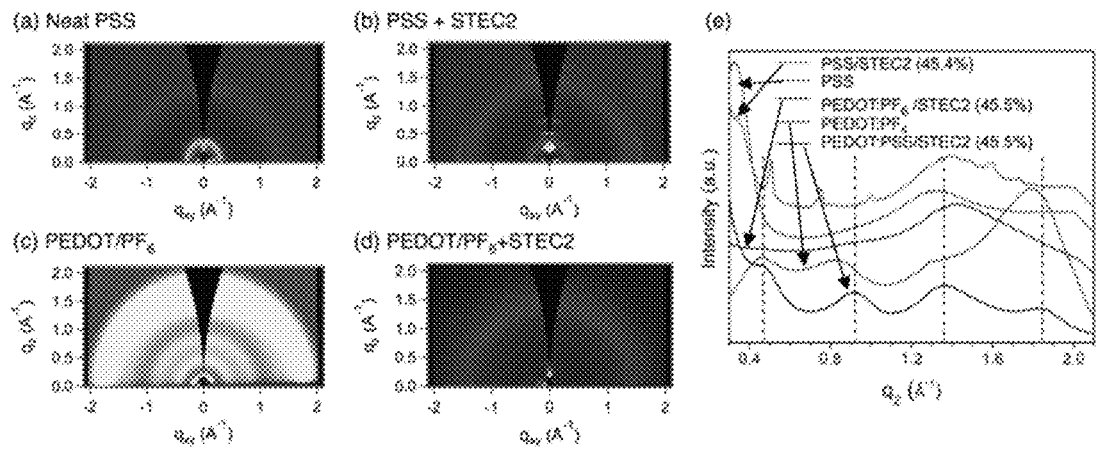
FIG. 13: Diffraction data for PSS and insoluble PEDOT control samples. (a)-(d) GIWAXS data for (a) neat PSS (MW of about 200,000 Da), (b) PSS+about 45.5 wt. % STEC 2, (c) PEDOT/$PF_6$, and (d) PEDOT/$PF_6$+about 45.5 wt. % of STEC 2. (e) Line cut plots of (a)-(d) along the $q_z$ direction (30-degree width sector) compared to that of PEDOT:PSS with about 45.5 wt. % of STEC 2.

To further confirm the indexing of the PEDOT/STEC systems, control experiments are performed by collecting GIWAXS patterns of individual STEC, neat PSS blended with about 45-70 wt. % STEC, and an insoluble PEDOT mechanically grinded with about 45-70 wt. % STEC (see part (c) and FIG. 14 for experimental details). FIG. 13 shows the GIWAXS patterns and the corresponding intensity plots for near $q_z$ direction. Neat PSS showed two broad diffraction rings (FIG. 13a), but several diffraction arcs appeared with the addition of STEC 2 (FIG. 13b). The peak at $q_z$=about 1.36 $Å^{-1}$ matches with the one in the PEDOT:PSS/STEC 2 scattering images, further confirming it originates from PSS. For the insoluble PEDOT/$PF_6$, characteristic scattering peaks similar to that of the PEDOT:PSS/STEC 2 were observed (FIGS. 13c and e), confirming the interpretation of PEDOT:PSS/STEC 2 patterns. The weak diffraction at $q_z$=about 1.28 $Å^{-1}$ is likely from the interactions between $PF_6^-$ ions. The crystallinity is largely decreased after the addition of STEC 2 (FIGS. 13d and e), likely as a result of the plasticizing effect. Note that neat PSS becomes more crystalline after the addition of STEC 2, while insoluble PEDOT:$PF_6$ becomes less crystalline, which is the opposite trend of the PEDOT:PSS system. The inter-mixing of two charged polymers can readily change the interaction within the individual components, hence have very different effects on the relative crystallinity. Also, neat STEC 1 and 2 did not lead to any diffraction patterns, which further indicates that none of the peaks from FIG. 12 originates from STEC aggregates.

(c) Effect on Mechanical Properties

Despite the much-enhanced crystallinity of the PEDOT films with STEC 1 or 2 addition, these films also possess higher stretchability. The increase in crystallinity mostly corresponds to the PEDOT-rich domains, which indicates the plasticizers are likely dispersed in the disordered matrix. To probe the interaction between STEC and PEDOT:PSS, STEC is incorporated into PEDOT and NaPSS separately. Insoluble PEDOT:$PF_6$ was synthesized according to a previous procedure. The product is a black powdery substance (FIG. 14a). Vigorous sonication of this powder in water for about 1 h yielded a dark dispersion (FIG. 14b, left). However, the particles settled out within minutes, confirming its insoluble nature (FIG. 14b, right). When about 45.5 wt. % of STEC 2 was grinded with the PEDOT powder, a homogeneous paste was formed (FIG. 14c), while incorporating about 62.5 wt. % of STEC 2 led to a gel-like substance (FIG. 14d). Therefore, STEC can serve as an effective plasticizer for the PEDOT component in PEDOT:PSS. The STEC has an effect in dispersing the insoluble PEDOT. The paste with about 45.5 wt. % STEC 2 has poor film forming property, likely due to the low molecular weight of PEDOT, hence prohibited it from tensile strain/stress testing.

About 45.5 wt. % of STEC 2 was also incorporated into NaPSS. The MW of about 200,000 Da grade was selected as it is the closest in molecular weight to the PSS in Clevios PH1000 (400,000 Da). A much lower modulus and a significantly enhanced maximum tensile strain is observed for the NaPSS film with STEC compared to the pristine NaPSS, indicating its plasticizing effectiveness. Therefore, due to the strong interaction between STEC and both PEDOT and PSS components, it is proposed that STEC plasticizers are incorporated in the disordered domains of PEDOT:PSS, rendering the films highly stretchable.

Furthermore, the fibrous network formed from phase separation between PEDOT and PSS is desired for achieving stretchability. It is observed that the PEDOT/STEC films with the highest stretchability all possess some level of fibrous or web-like morphology (FIG. 11g j). However, morphology alone does not guarantee high stretchability; for instance, PEDOT/STEC 6 (FIG. 11d) also exhibit well-defined fibrous morphology, but is moderately stretchable (maximum tensile strain=about 71% as a free-standing film). Therefore, it is proposed that the combination of the effectiveness of individual STEC enhancers with the fibrous morphology results in high stretchability observed in select PEDOT/STEC systems.

Morphology of PEDOT/STEC Film Interior

Figure 15:
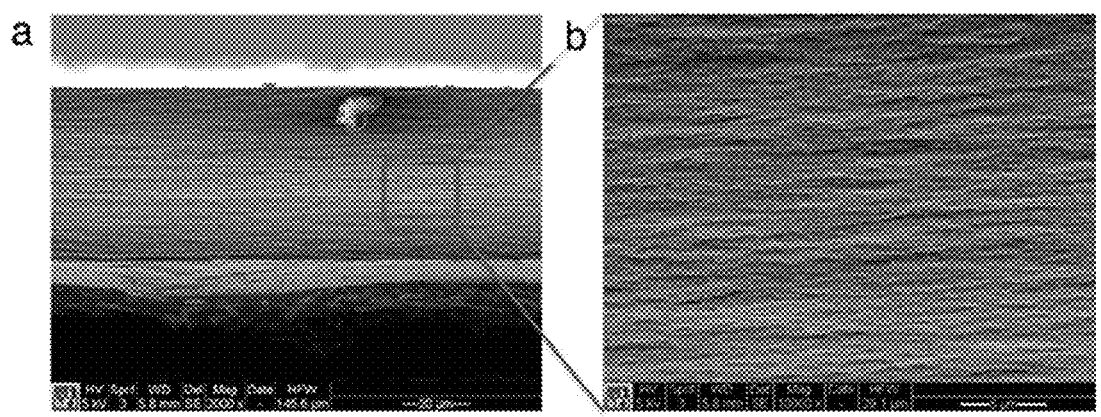
FIG. 15: (a) SEM image showing the solid cross-section of a PEDOT film with about 45.5 wt. % STEC 2; (b) offers a zoomed view of (a).

SEM analyses show that the PEDOT/STEC 2 films have a solid and densely packed cross-section despite the high STEC weight percentage, indicating the STEC is well dispersed in the polymer network (FIG. 15).

Electrical Properties of PEDOT/STEC Films (a) Conductivity of as-Processed Vs. Treated Films Conductivity is influenced by the processing method of PEDOT/STEC due to the different drying kinetics that can lead to different film morphology and chain arrangement. Values for drop cast thick films (>about 20 μm) and spin coated thin films containing various STEC contents are presented below. It is found that an additional STEC solution soaking process can further enhance the conductivity. In this process, an about 10 mg/mL STEC aqueous solution is dropped on top of an annealed PEDOT film, followed by a pause period of about 60-90 seconds, and then the excess solution is removed with a fast spin speed (about 3000 rpm). The resulting films exhibit a higher PEDOT content on the surface (see FIG. 18 and corresponding text for detailed discussion) and an enhanced conductivity (FIGS. 16c, 17).

For PEDOT/STEC 1-3 samples, which are model systems in this example, a rapid increase in conductivity was observed as the STEC concentration increased until about 45 wt. % (FIG. 6a). The highest conductivity values achieved were about 2588, about 3102, and about 2544 S/cm at about 71 wt. % STECs 1, 2, and 3, respectively. This great enhancement in conductivity compared to the pristine PEDOT:PSS is at least partly attributed to the doping and chain straightening effects resulted from STEC-induced charge screening. For STECs 1 and 2, due to the strongly electron-withdrawing $CF_3$ moieties, the anions have much higher acidity than the PSS anions, which render them effective dopants for PEDOT in addition to serving as plasticizers and tuning microscopic morphology. The anion in STEC 3 has a similar acidity as PSS; therefore, a much slower increase in conductivity was observed with the increase of STEC content. At high STEC 3 concentration, a similarly high conductivity was achieved, possibly due to the abundance of STEC anions, which are more effective dopants than the polymeric PSS due to their greater mobility between polymer chains, as observed for tosylate anions. PEDOT with other STEC additives show similar behavior, which are illustrated in FIGS. 16-17.

(b) Chemical Characterization of Solvent-Treated Films

To understand the additional STEC aqueous solution treatment stage on stretchable PEDOT, XPS and AFM evaluations are performed. The film thickness decreases for all films after the STEC solution soaking regardless of the STEC used (FIG. 18a). XPS of the film surface reveals that a higher PEDOT content is exposed (peak of about 163-165 eV) and the PSS+STEC amount (about 168-170 eV) decreases (FIG. 18b). Similar observations can be seen from the AFM images in FIG. 18c-f, as the PEDOT phase content is visibly higher, as indicated by the more fiber-like structures. Control experiments of dropping water instead of STEC solution on top of the annealed PEDOT films lead to a similar decrease in thickness and increase in conductivity. STEC aqueous solutions are used here in order to wash away PSS but reduce STEC loss as they serve as plasticizers.

Composition of PEDOT/STEC Films

Figure 19:
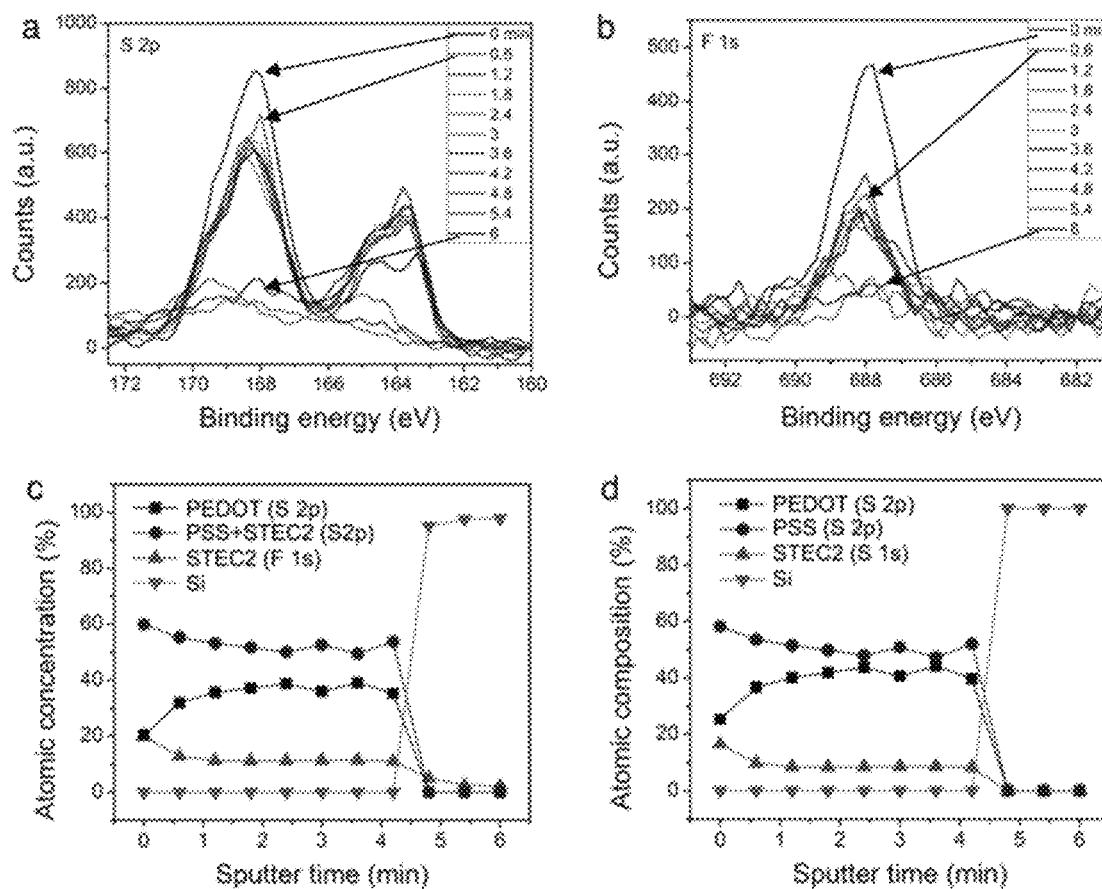
FIG. 19: (a)-(b) XPS spectra of a PEDOT/STEC 2 film with various $C_{60}$ ion gun sputtering duration for S 2p (a) and F 1s (b). (c) Atomic ratio between the integrated S 2p and F 1s peaks showing the relative ratios of the various elements in the film. (d) Relative composition of PEDOT, PSS, and STEC 2 along at various depths. The composition of STEC 2 (S 2p) is determined by the stoichiometric conversion of the F 1s peak based on the molecular structure. PSS (S 2p) composition can thus be obtained by subtracting the STEC 2 (S 2p) percentage from the PSS+STEC 2 (S 2p) values in (c).

FIG. 19 shows results of an evaluation of the composition of a PEDOT/STEC 2 film.

Low Temperature Measurements.

Figure 20:
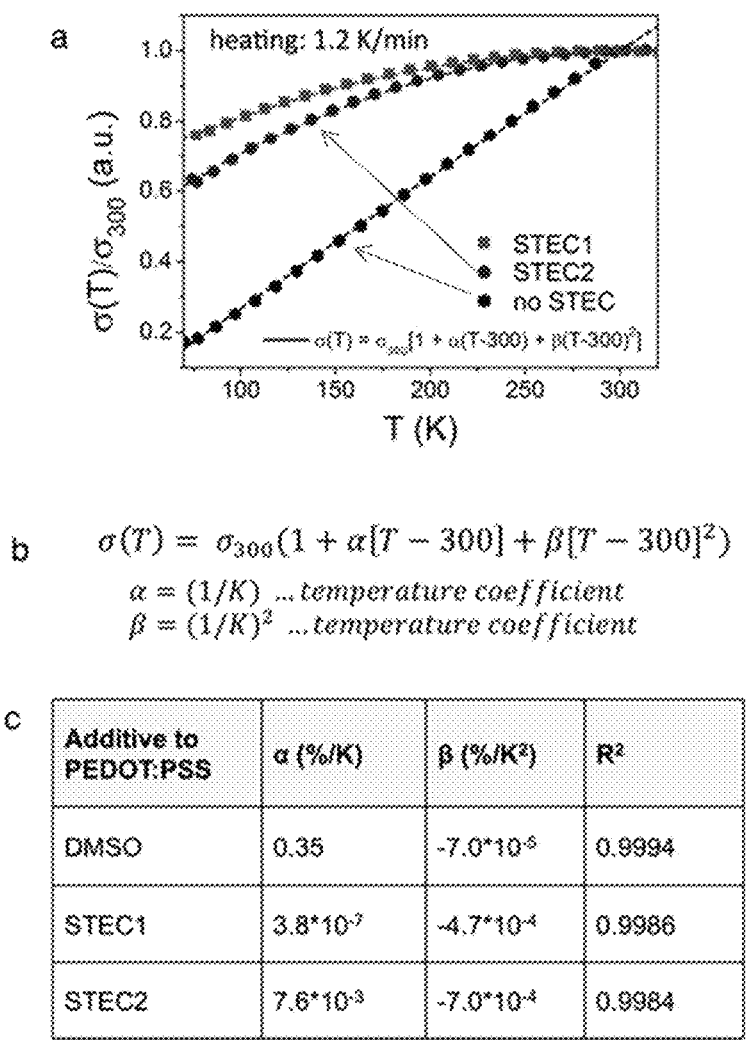
FIG. 20: (a) Temperature-dependent conductivity of PEDOT films with various additives; (b) equation for extracting temperature coefficients; and (c) Table showing the temperature coefficient and conductivity of the films.
Figure 21:
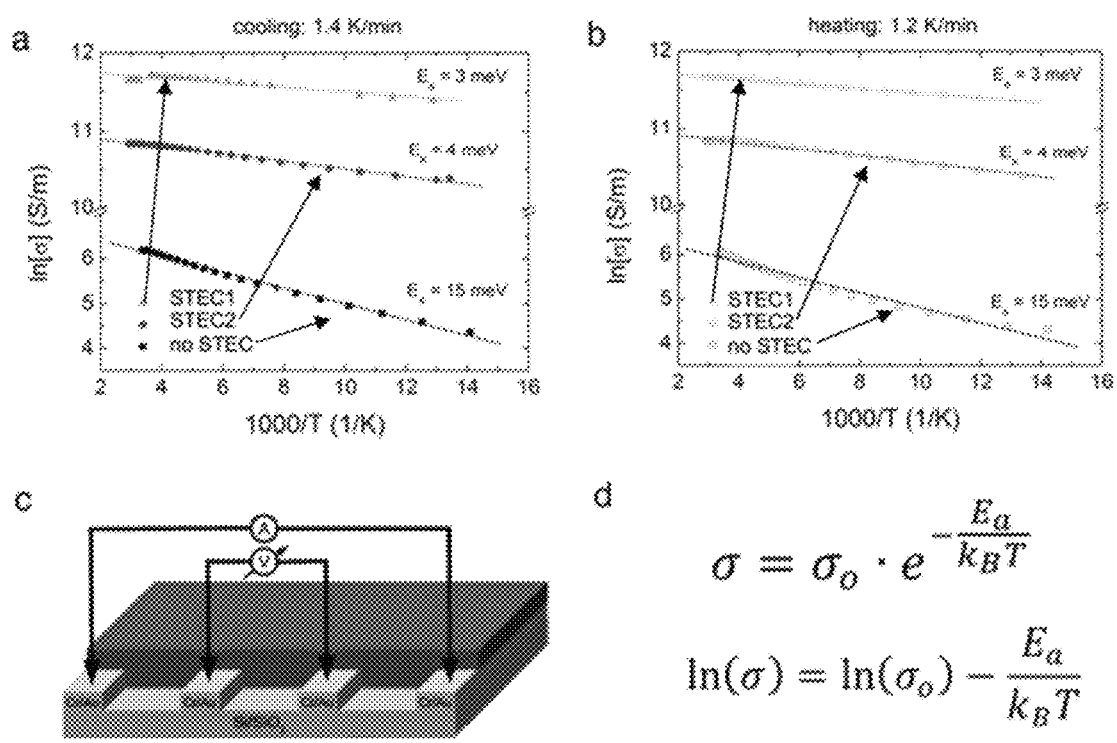
FIG. 21: Arrhenius plots for PEDOT with various additives upon (a) cooling and (b) heating; (c) schematic illustrating the measurement geometry; and (d) equations for extracting activation energy from the temperature dependent conductivity behavior.

FIGS. 20-21 show results of temperature measurements of PEDOT with various additives.

Figure of Merit (FoM) for Transparent Conductors

A metric for evaluating a transparent conductor is its figure of merit (FoM), which is specified as the ratio of its direct current conductivity ($\sigma_{dc}$) to optical conductivity ($\sigma_{op}$):

$$FoM = \frac{\sigma_{dc}}{\sigma_{op}(\lambda)} = \frac{188.5 \ \Omega}{R_{sh} \cdot \left(T(\lambda)^{-\frac{1}{2}} - 1\right)},$$

where $R_{sh}$ is the sheet resistance, T is the optical transparency at a specified wavelength λ (e.g., 550 nm). A FoM of about 35 is typically the specified benchmark value for a transparent conductor to be commercially viable. The stretchable PEDOT/STEC exhibit FoM above about 100 for all thicknesses tested (FIG. 6e), with a value as high as about 142 for the film with about 96% transmittance. It surpasses the highest value from spin-casted PEDOT films (FoM=72 for $H_2SO_4$-treated films).

Microscopy Evaluation of the Effect of Tensile Strain on PEDOT/STEC Films

FIGS. 22-25 show optical microscope images of PEDOT/STEC films.

Testing Geometry for PEDOT Films Under Tensile Strain

Figure 26:
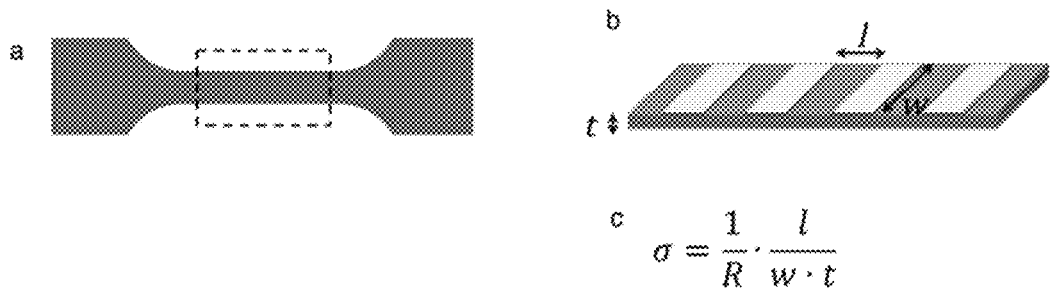
FIG. 26: (a) Geometry of PEDOT films used for testing resistance change under tensile strain. The dashed rectangle represents area being stretched. (b) Four-point probe measurement geometry and (c) equation for calculating conductivity.

A dumbbell geometry is used for the resistance vs. strain experiments to promote uniform deformation within the stretched region (FIG. 26a). Four parallel EGaIn electrodes were deposited either in parallel or perpendicular to the stretching direction to probe anisotropic conductivity (FIG. 26b). The dimension change between the electrodes was measured at each strain value and the film thickness change was extracted using optical measurements. Conductivity values were then calculated using the equation in FIG. 26c.

Polarized UV-Vis-NIR Spectra for PEDOT Films Under Tensile Strain

Figure 27:
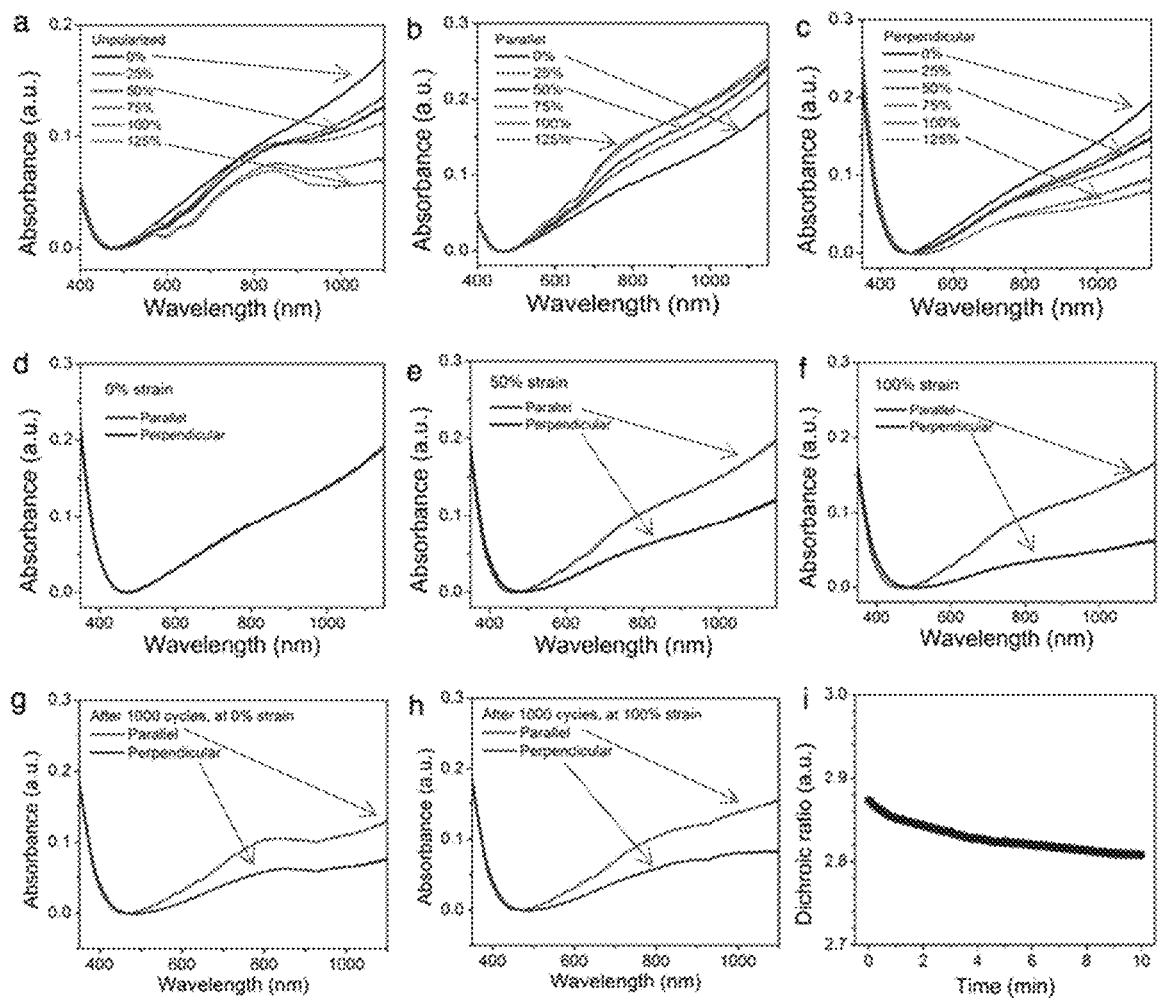
FIG. 27: (a) Unpolarized UV-vis-NIR spectra of PEDOT/STEC 1 film under various tensile strains. (b) and (c) UV-vis-NIR spectra of the film under various strains measured using incident light that is polarized (b) parallel and (c) perpendicular with respect to the stretching direction; (d)-(f) offer comparison of the polarized UV-vis-NIR spectra along the parallel and perpendicular directions for PEDOT films under 0%, about 50%, and about 100% strains, respectively. The polarized UV-vis-NIR spectra of a PEDOT/STEC 1 film after returning from 1000 cycles to about 100% is shown in (g), and those for the cycled film held under about 100% strain is shown in (h). (i) The dichroic ratio of the film is monitored over time, which shows a slow decay under constant tension at about 100%.
Figure 28:
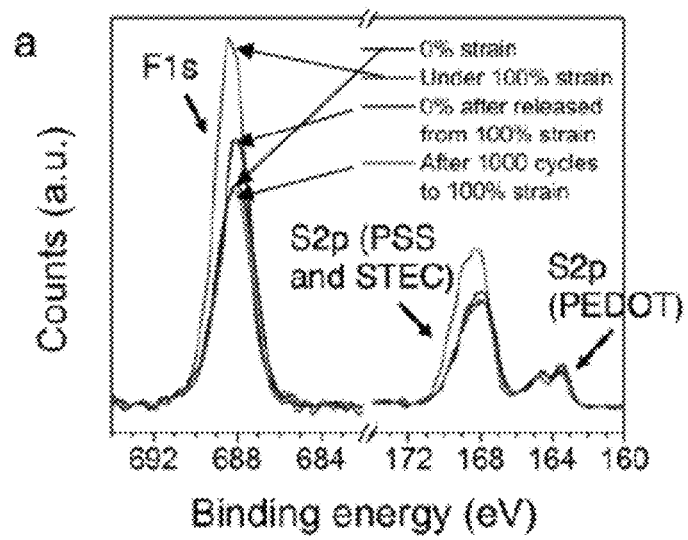
FIG. 28: XPS analysis of film surfaces under 0% vs. about 100% strain, after returning from about 100% to 0% strain, and after 1000 stretching cycles to about 100% strain.
Figure 29:
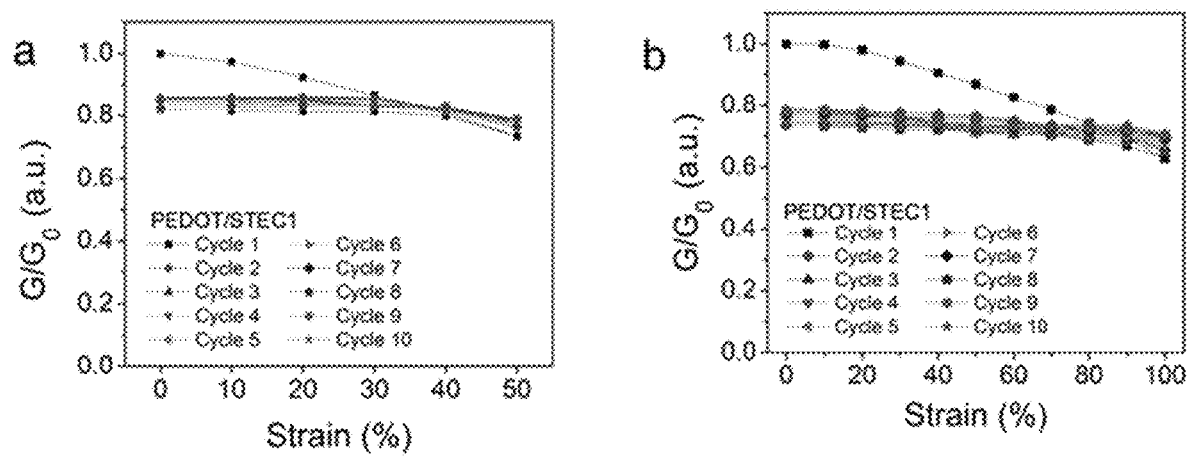
FIG. 29: Change in PEDOT/STEC 1 film conductance under various strains for the first 10 cycles between (a) 0 to about 50% strain and (b) 0 to about 100% strain. Cycling stability plots are shown in FIGS. 4c and d.
Figure 30:
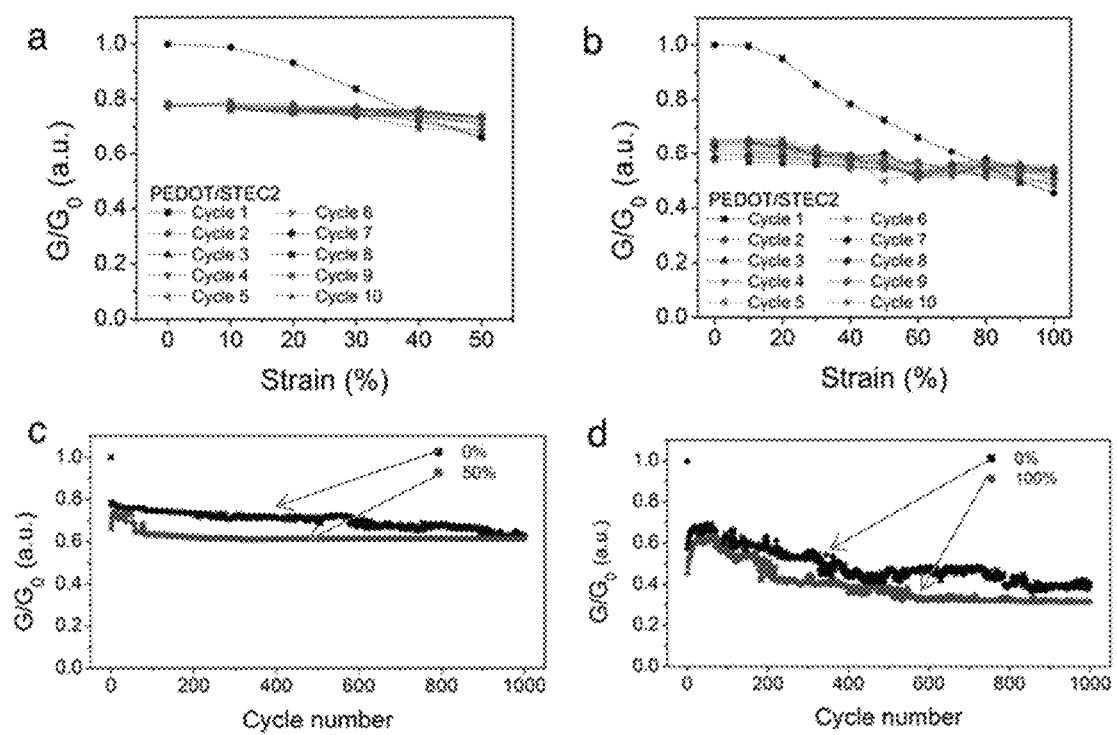
FIG. 30: Change in PEDOT/STEC 2 film conductance under various strains for the first 10 cycles between (a) 0 to about 50% strain and (b) 0 to about 100% strain. (c) and (d) show the conductance stability of the films when cycled 1000 times to (c) about 50% and (d) about 100%.

To evaluate the anisotropy in PEDOT/STEC films upon stretching, polarized UV-vis-NIR spectra were collected. FIG. 27a shows unpolarized spectra for the PEDOT/STEC 1 film under various strains. The absorbance consistently decreases with increasing strain because the film is getting thinner. However, the peak at about 810 nm becomes more pronounced with increasing strain, and two small peaks at about 570 and about 620 nm appear. These peaks are all associated with de-doped PEDOT, indicating some level of dopant removal of the film as the strain is increased. However, when the incident light is polarized parallel to the stretching direction, the intensity of the free-carrier tail that extends into the NIR (a bipolaron subgap state) increases in intensity under 0%-125% strain despite the decreasing film thickness, indicating significant amount of chain alignment along the stretching direction (FIG. 27b). The peaks associated with de-doping of PEDOT (about 570, about 620 and about 810 nm) are also present in these spectra, but not in those with light polarized perpendicular to the stretching direction (FIG. 27c). This indicates that as the PEDOT chains are becoming highly aligned, a certain amount of STEC are squeezed out as a result of the tighter inter-chain packing. XPS analysis (incident beam normal to sample surface) further confirms this behavior as the XPS spectra on F 1s peaks (elements solely present in the STEC) show a noticeable increase in relative intensity when the film is stretched to about 100% (FIG. 28). The ratio between the S 2p peaks associated with PSS+STEC (about 172-175 eV) to that of PEDOT (about 164-165 eV) increases upon about 100% tensile strain, further indicating the increase in surface STEC content that are squeezed out due to chain alignment. Note that despite this strain-induced de-doping phenomenon, the conductivity of the film increases significantly from 0% to about 100% strain along the stretching direction (see FIG. 4a, b and previous analysis), likely due to the much more efficient carrier transport through the oriented chains. The surface STEC content decreases after the film is relaxed from about 100% strain back to 0% (FIG. 28), indicating the STEC molecules are partially absorbed back into the film during the process. After 1000 stretching cycles, the surface STEC content becomes almost identical as the pristine film, indicating an equilibrium is reached after repeated cycling. This cycling-induced equilibrium can also be observed in the dichroic ratio plot in FIG. 4g. During the first stretch, the PEDOT film has a dichroic ratio of about 1 at 0% strain and about 2.8 at about 100% strain. However, after 1000 cycles to about 100% strain, the dichroic ratio of the same film stabilizes at about 1.8 at both 0% and about 100% strain, indicating equilibrium has been reached.

When UV-vis-NIR is collected with light polarized perpendicular to the stretching direction, a consistent decrease in intensity is observed as opposed to the increase in intensity of the spectra with light polarized in parallel direction, despite the decrease in film thickness due to elongation (FIG. 27b, c). This phenomenon is also likely a result of chain alignment, as the optical density will increase along the stretching direction, but decrease in the perpendicular direction.

Cycling Stability and Morphological Change of PEDOT with STEC Additives

FIGS. 29-32 show results of evaluation of cycling stability and morphological change of PEDOT/STEC films.

Mixed Ion-Electron Conductivity

Figure 33:
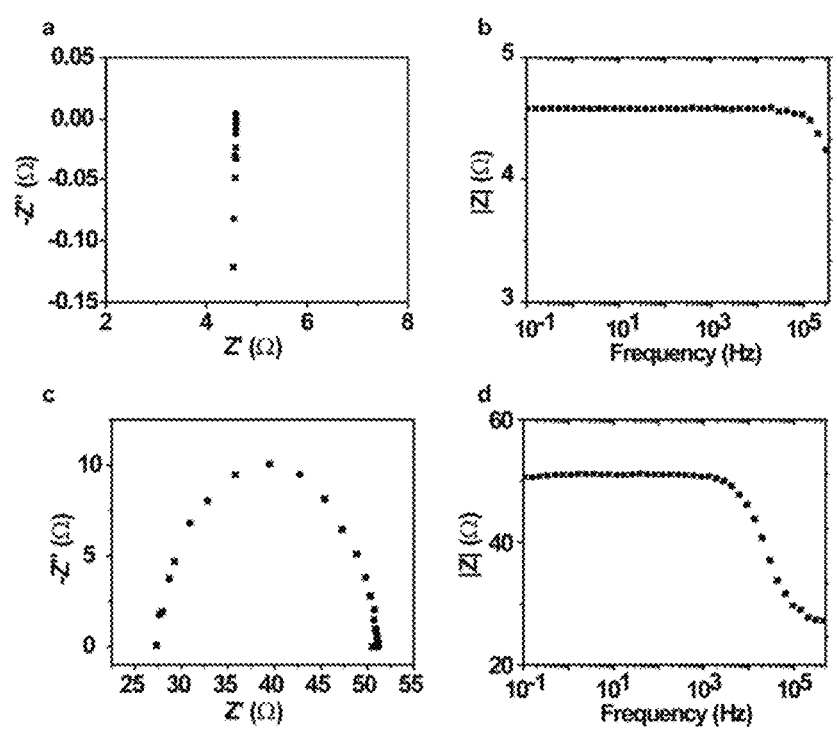
FIG. 33: (a) Electrochemical impedance spectra of PEDOT:PSS with STEC 1 in the form of Nyquist plot. (b) The variation of the impedance of the PEDOT:PSS with STEC 1 to the frequency. (c) Electrochemical impedance spectra of PEDOT:PSS with STEC 2 in the form of Nyquist plot. (d) The variation of the impedance of the PEDOT:PSS with STEC 2 to the frequency.

FIGS. 33a and b shows typical electrochemical impedance spectra of PEDOT:PSS with STEC 1 in the form of Nyquist plot and bode plot, respectively. The Nyquist plot of PEDOT:PSS with STEC 1 shows an inductive line indicating that it is almost a pure electronic conductor. The inductive line in FIG. 33a and small decrease of resistance in high frequency region in FIG. 33b are mainly due to instrumental error. The result shows that PEDOT:PSS with STEC 1 samples (n=3) have resistance of 4.55±0.04Ω under ambient conditions (moisture level of about 42%).

FIGS. 33c and d shows typical electrochemical impedance spectra of PEDOT:PSS with STEC 2 in the form of Nyquist plot and bode plot, respectively. Unlike the PEDOT:PSS with STEC 1 sample, the one semicircle in FIG. 33c indicates that PEDOT:PSS with STEC 2 is a mixed electronic/ionic conductive material. The equivalent circuit of this mixed conductor can be represented as a parallel combination of electronic resistance, Re, and ionic resistance, Ri, which is in series with a capacitor. Then, the intersection of the high frequency line with the real (Z') axis is the resistance of the electronic and ionic resistance in parallel, RiRe/(Ri+Re), and the intersection of the low-frequency line with the Z' axis is the electronic resistance, Re. The result shows that PEDOT:PSS with STEC 2 samples (n=3) possess electronic resistance of 51.5±9.2Ω and ionic resistance of 68.1±12.7Ω under ambient conditions (moisture level of about 42%).

PEDOT/STEC as Interconnects for FET Arrays

Figure 34:
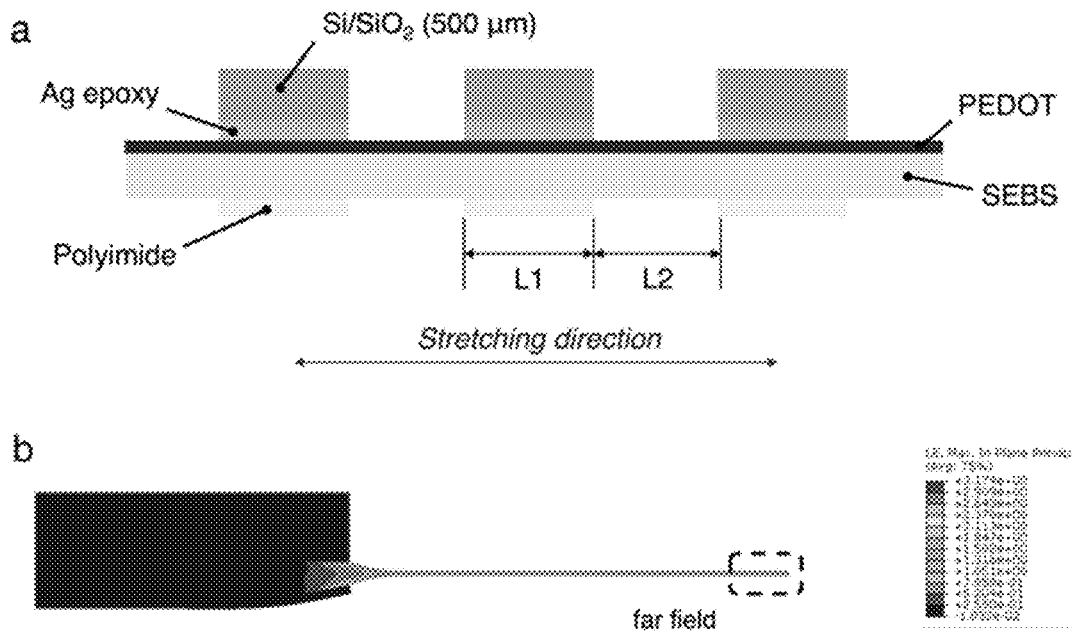
FIG. 34: (a) Schematic showing the cross-sectional view of a linear rigid-island array connected with stretchable PEDOT used for the finite element simulation shown in (b).
Figure 35:
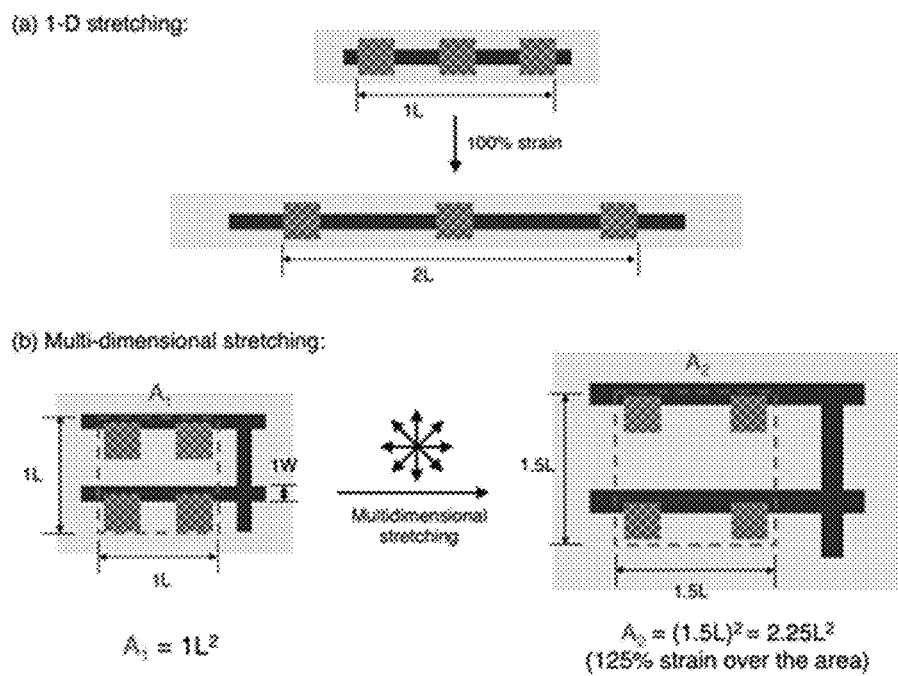
FIG. 35: Illustration showing the determination of strain for (a) linear rigid-island arrays under unidirectional stretching vs. (b) two-dimensional arrays under multidimensional stretching.

PEDOT/STEC is used as a stretchable interconnect for FET arrays based on rigid-island structures. As the device density increase (e.g., the ratio between rigid islands to PEDOT interconnects increase), the actual strain on the PEDOT interconnects increases monotonically for the same overall strain on the entire array. FIG. 34 illustrates and summarizes such effects through finite element simulation. For 2 dimensional arrays (e.g., 3×3), the array was clamped between 2 fitted hollow rings to allow uniform stretching in all directions. Schematic and calculations for areal strain is shown in FIG. 35b. The FET transfer characteristics are summarized in FIGS. 36, 37, and 38 for a high density (about 5:1 rigid island:interconnect ratio) one-dimensional array under unidirectional stretching, 3×3 two-dimensional array under multi-dimensional stretching on a flat surface, and an identical 3×3 array under multi-dimensional stretching on a curved surface, respectively. Table 2 summarizes the mobility and threshold voltage shift at 0% and about 125% strain for the devices show in FIG. 37.

TABLE 2

Summary of mobility and threshold voltage shift for the 3 × 3 transistor arrays under 0% and about 125% strain. Slight variation in the mobility values (<about 10%) between array under 0% vs. about 125% strain were observed for some of the devices. This could be attributed to the minor fluctuation of the interconnect resistance with strain, which causes the actual gate voltages to vary from the applied value.

| | Mobility ($cm^2/V/s$) | | Normalized mobility ($cm^2/V/s$) | | $V_{th}$ shift |
| --- | --- | --- | --- | --- | --- |
| Device | 0% strain | 125% strain | 0% strain | 125% strain | (V) |
| 1 | 2.110 | 2.140 | 1 | 1.010 | −3.17 |
| 2 | 0.887 | 0.834 | 1 | 0.940 | 2.83 |
| 3 | 1.300 | 1.280 | 1 | 0.985 | 2.45 |
| 4 | 2.460 | 2.290 | 1 | 0.931 | −2.91 |
| 5 | 0.531 | 0.528 | 1 | 0.994 | 4.83 |
| 6 | 0.773 | 0.749 | 1 | 0.969 | 5.65 |
| 7 | 0.998 | 1.050 | 1 | 1.052 | −2.00 |
| 8 | 0.670 | 0.709 | 1 | 1.058 | 4.31 |
| 9 | 1.450 | 1.430 | 1 | 0.986 | −1.33 |

As used herein, the singular terms "a," "an," and "the" may include plural referents unless the context clearly dictates otherwise. Thus, for example, reference to an object may include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. An electronic device comprising:
   a stretchable conductor including a polymer composition which includes
   a conductive polymer; and
   at least one stretchability and electrical conductivity (STEC) enhancer different from the conductive polymer,
   wherein the STEC enhancer is a compound including an anion, and a content of the STEC enhancer in the polymer composition is at least 1 wt. % of the polymer composition, wherein the polymer composition does not include sulfonylimide anions.

2. The electronic device of claim 1, wherein the conductive polymer is poly(3,4-ethylenedioxythiophene):polystyrene sulfonate.

3. The electronic device of claim 1, wherein the content of the STEC enhancer is in a range of 10 wt. % to 80 wt. % of the polymer composition.

4. The electronic device of claim 1, wherein the STEC enhancer includes a moiety selected from —(SO$_2$)—, ⁻O—(SO$_2$)—,

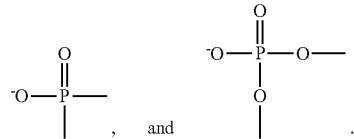

5. The electronic device of claim 1, further comprising an array of circuit components connected through the stretchable conductor.

6. The electronic device of claim 1, wherein the stretchable conductor has a conductivity at 0% strain of at least 1000 S/cm.

7. The electronic device of claim 1, wherein the stretchable conductor has a conductivity at 100% strain of at least 1000 S/cm.

8. The electronic device of claim 1, wherein the stretchable conductor has a maximum tensile strain of at least 50%.

9. The electronic device of claim 1, wherein the STEC enhancer includes:

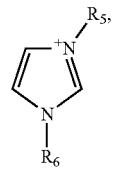

wherein

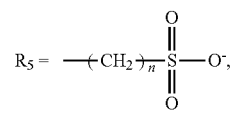

n=1-8; and R$_6$ includes (1) a linear or branched alkyl group; (2) a linear or branched alkyl ether group; or (3) a linear or branched alkyl ester group.

* * * * *